United States Patent
Hiasa

(10) Patent No.: US 10,382,710 B2
(45) Date of Patent: Aug. 13, 2019

(54) IMAGE PROCESSING APPARATUS, IMAGE CAPTURING APPARATUS, AND NON-TRANSITORY COMPUTER-READABLE STORAGE MEDIUM

(71) Applicant: CANON KABUSHIKI KAISHA, Tokyo (JP)

(72) Inventor: Norihito Hiasa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 15/557,293

(22) PCT Filed: Jul. 27, 2016

(86) PCT No.: PCT/JP2016/003460
§ 371 (c)(1),
(2) Date: Sep. 11, 2017

(87) PCT Pub. No.: WO2017/022208
PCT Pub. Date: Feb. 9, 2017

(65) Prior Publication Data
US 2018/0063453 A1 Mar. 1, 2018

(30) Foreign Application Priority Data
Aug. 5, 2015 (JP) ................................ 2015-155150

(51) Int. Cl.
*H04N 5/355* (2011.01)
*H04N 5/72* (2006.01)
(Continued)

(52) U.S. Cl.
CPC ......... *H04N 5/35563* (2013.01); *G06T 5/007* (2013.01); *H04N 5/2355* (2013.01);
(Continued)

(58) Field of Classification Search
CPC .. H04N 5/35563; H04N 5/2355; G06T 5/007; G06T 2207/20208; G06T 2207/20024
See application file for complete search history.

(56) References Cited

U.S. PATENT DOCUMENTS 8,269,852 B2  9/2012  Shiraishi et al.
9,083,898 B2  7/2015  Kanemitsu et al.
(Continued)

FOREIGN PATENT DOCUMENTS

JP  2014168112 A  9/2014
JP  2014220717 A  11/2014
(Continued)

OTHER PUBLICATIONS

International Search Report issued in Intl. Appln. No. PCT/JP2016/003460 dated Sep. 6, 2016.
(Continued)

*Primary Examiner* — Ahmed A Berhan
(74) *Attorney, Agent, or Firm* — Rossi, Kimms & McDowell LLP

(57) ABSTRACT

An image processing apparatus includes an image acquirer configured to acquire a first image that is generated by image capturing and includes information of light intensity distributions obtained with a plurality of different exposures provided with transmittance distributions that are different from one another, an information acquirer configured to acquire information on the transmittance distributions, and an image estimator configured to separate image signals corresponding to two or more exposures among the plurality of exposures from the first image in the same pixel based on an estimation using the information on the transmittance distributions, and to generate two or more second images using the separated image signals.

11 Claims, 16 Drawing Sheets

(51) Int. Cl.
*G06T 5/00* (2006.01)
*H04N 5/235* (2006.01)

(52) U.S. Cl.
CPC ..... *H04N 5/72* (2013.01); *G06T 2207/20024* (2013.01); *G06T 2207/20208* (2013.01)

(56) References Cited

U.S. PATENT DOCUMENTS

| | | | |
|---|---|---|---|
| 2004/0100565 A1 | 5/2004 | Chen et al. | |
| 2010/0259626 A1* | 10/2010 | Savidge | H04N 5/235 348/208.4 |
| 2014/0240536 A1* | 8/2014 | Kanemitsu | H04N 5/35563 348/229.1 |

FOREIGN PATENT DOCUMENTS

| | | |
|---|---|---|
| JP | 2015087401 A | 5/2015 |
| WO | 2009035148 A1 | 3/2009 |

OTHER PUBLICATIONS

Written Opinion issued in Intl. Appln. No. PCT/JP2016/003460 dated Sep. 6, 2016.
Baraniuk. "Compressive Sensing." IEEE Signal Processing Magazine. Jul. 2007:118-120, 124. Cited in the specification.
Bioucas-Dias et al. "A new TwIST:Two-Step Iterative Shrinkage/Thresholding Algorithms for Image Restoration." IEEE Transactions on Image Processing. Dec. 2007:2992-3004. vol. 16, No. 12. Cited in specification.
Heide et al. "High-Quality Computational Imaging Through Simple Lenses." ACM Transactions on Graphics. 2013:1-13. vol. 32. No. 5. Cited in specification.

* cited by examiner

REPLACEMENT SHEET

103a: $\dfrac{r_1}{\sum_{k=1}^{4} r_k} = 0.0017$    103b: $\dfrac{r_1}{\sum_{k=1}^{3} r_k} = 0.0137$    $\dfrac{r_1}{\sum_{k=1}^{4} r_k} = 0.0017$ ......

103c: $\dfrac{r_1}{\sum_{k=1}^{2} r_k} = 0.1111$    $\dfrac{r_1}{r_1} = 1.0000$   103d $\dfrac{r_1}{\sum_{k=1}^{4} r_k} = 0.0017$

FIG. 4A

103a: $\dfrac{r_2}{\sum_{k=1}^{4} r_k} = 0.0137$    103b: $\dfrac{r_2}{\sum_{k=1}^{3} r_k} = 0.1096$    $\dfrac{r_2}{\sum_{k=1}^{4} r_k} = 0.0137$ ......

103c: $\dfrac{r_2}{\sum_{k=1}^{2} r_k} = 0.8889$    $0.0000$   103d $\dfrac{r_2}{\sum_{k=1}^{4} r_k} = 0.0137$

FIG. 4B $$\frac{r_3}{\sum_{k=1}^{4} r_k} = 0.1094 \quad \frac{r_3}{\sum_{k=1}^{3} r_k} = 0.8767 \quad \frac{r_3}{\sum_{k=1}^{4} r_k} = 0.1094$$

103a, 103b (top row)
103c, 103d 0.0000    0.0000

$$\frac{r_3}{\sum_{k=1}^{4} r_k} = 0.1094$$

FIG. 5A $$\frac{r_4}{\sum_{k=1}^{4} r_k} = 0.8752 \quad 0.0000 \quad \frac{r_4}{\sum_{k=1}^{4} r_k} = 0.8752$$

0.0000    0.0000

$$\frac{r_4}{\sum_{k=1}^{4} r_k} = 0.8752$$

FIG. 5B

IMAGE PROCESSING APPARATUS, IMAGE CAPTURING APPARATUS, AND NON-TRANSITORY COMPUTER-READABLE STORAGE MEDIUM

TECHNICAL FIELD

The present invention relates to an image processing technology for acquiring a plurality of images with different exposures.

BACKGROUND ART

A dynamic range narrows as the pixel miniaturization proceeds in an image sensor, such as a CMOS sensor, along with a demand for a higher pixel density of an image pickup apparatus. As the dynamic range narrows, the underexposure and luminance saturation are likely to occur in each of a shadow part and a highlighted part in a captured image and thus the image quality deteriorates.

In processing a captured image with a narrow dynamic range using a correction filter, such as a Wiener filter, information of luminance saturation part is not correctly acquired and a problem, such as ringing, is likely to occur. Accordingly, each of Patent Literatures ("PLTs") 1 and 2 proposes a method for acquiring a plurality of images with different exposures, for combining them with one another, and for acquiring a high dynamic range ("HDR") image with an enlarged dynamic range.

CITATION LIST

Patent Literature

[PLT1] Japanese Patent Laid-Open No. 2014-220717
[PLT2] Japanese Patent Laid-Open No. 2014-168112

SUMMARY OF INVENTION

Technical Problem

However, each of the methods disclosed in PLTs 1 and 2 for acquiring a plurality of images with different exposures disadvantageously increases an image data amount and deteriorates the resolution.

PLT1 acquires a plurality of images with different exposures by capturing images a plurality of times with different exposures in the image capturing apparatus, and thus needs a data amount for storing images by the number of image captures. In addition, in capturing a scene with a very large luminance difference, it is necessary to increase the number of image captures so as to cover the dynamic range. However, in order to sufficiently reduce a temporal change of an object in this case, it is necessary to read a signal out of an image sensor at a high speed. It is thus difficult to reconcile both a suppressed temporal change of the object and the secured resolution of the image.

PLT2 acquires a plurality of images with different exposures by using an image sensor in which each of the arranged pixels has a plurality of small pixels to be differently exposed. Therefore, the resolution of the image lowers for each exposure due to the total number of pixels (when each small pixel is considered as one pixel).

The present invention provides an image processing apparatus and an image capturing apparatus, etc., which can generate a plurality of images with different exposures while preventing a data amount from increasing and a resolution from deteriorating.

Solution to Problem

An image processing apparatus according to one aspect of the present invention includes an image acquirer configured to acquire a first image that is generated by image capturing and includes information of light intensity distributions obtained with a plurality of different exposures provided with transmittance distributions that are different from one another, an information acquirer configured to acquire information on the transmittance distributions, and an image estimator configured to separate image signals corresponding to two or more exposures among the plurality of exposures from the first image in the same pixel based on an estimation using the information on the transmittance distributions, and to generate two or more second images using the separated image signals.

An image capturing apparatus according to another aspect of the present invention includes an image capturer configured to generate a captured image that includes information of light intensity distributions obtained with a plurality of different exposures provided with transmittance distributions that are different from one another, and an image processing apparatus according to any one of claims 1 to 9, the image processing apparatus being configured to acquire the captured image as the first image.

A non-transitory computer-readable storage medium according to still another aspect of the present invention stores a program configured to enable a computer to execute image processing. The image processing includes the steps of acquiring a first image that is generated by image capturing and includes information of light intensity distributions obtained with a plurality of different exposures provided with transmittance distributions that are different from one another, acquiring information on the transmittance distributions, and separating image signals corresponding to two or more exposures among the plurality of exposures from the first image in the same pixel based on an estimation using the information on the transmittance distributions, and generating two or more second images using the separated image signals.

Further features and aspects of the present invention will become apparent from the following description of exemplary examples with reference to the attached drawings.

Advantageous Effects of Invention

The present invention can provide a (second) image corresponding to two or more different exposures while preventing a data amount from increasing and a resolution from deteriorating.

BRIEF DESCRIPTION OF DRAWINGS

FIG. 4A is a view for explaining a transmittance distribution with an exposure of k=1 according to the first embodiment.

FIG. 4B is a view for explaining a transmittance distribution with an exposure of k=2 according to the first embodiment.

FIG. 5A is a view for explaining a transmittance distribution with an exposure of k=3 according to the first embodiment.

FIG. 5B is a view for explaining a transmittance distribution with an exposure of k=4 according to the first embodiment.

DESCRIPTION OF EMBODIMENTS

Exemplary embodiments of the invention will be described below with reference to the accompanied drawings.

Before concrete embodiments are described, a description will now be given of a common subject matter to each embodiment. In the conventional methods disclosed in PLT1 and PLT2, a data amount depends on a product of the resolution of the acquired image and the number of exposures. On the other hand, each embodiment acquires superimposed light intensity distributions with a plurality of exposures, or summed (combined) image signals with different exposures in one pixel. Then, an image with a different exposure (referred to as an "estimated image" hereinafter) is generated by separating image signals with respective exposures summed up in one pixel in the subsequent estimation using image processing. Thereby, each embodiment can obtain estimated images corresponding to a plurality of exposures while preventing a data amount from increasing and a resolution from lowering.

In the following description, an input image that includes information of light intensity distributions obtained with a plurality of different exposures will be referred to as an "input image in which a plurality of exposures are combined with one another," an "input image in which a plurality of light intensity distributions are superimposed," etc.

In order to generate estimated images corresponding to a plurality of combined exposures (light intensity distributions) by separating an image signal after image capturing, each embodiment provides transmittance distributions that are different from one another to a plurality of different exposures in image capturing. Image signals corresponding to the plurality of exposures which are once combined in image capturing can be subsequently separated using the above estimation with the information on the transmittance distributions.

The transmittance distribution may be provided to a pre-captured optical image (object space image) or a post-captured image. The number of exposures combined with the input image may not be equal to the number of exposures corresponding to the generated estimated images. For example, two estimated images corresponding to two exposures may be generated based on the input image with which four exposures are combined. In other words, the number of estimated images generated by the estimation may be two or more irrespective of the number of combined exposures.

Although a process to a monochromatic image will be described in each embodiment for simplicity purposes, a process according to each embodiment is applicable to a color image.

Example 1

Figure 2A:
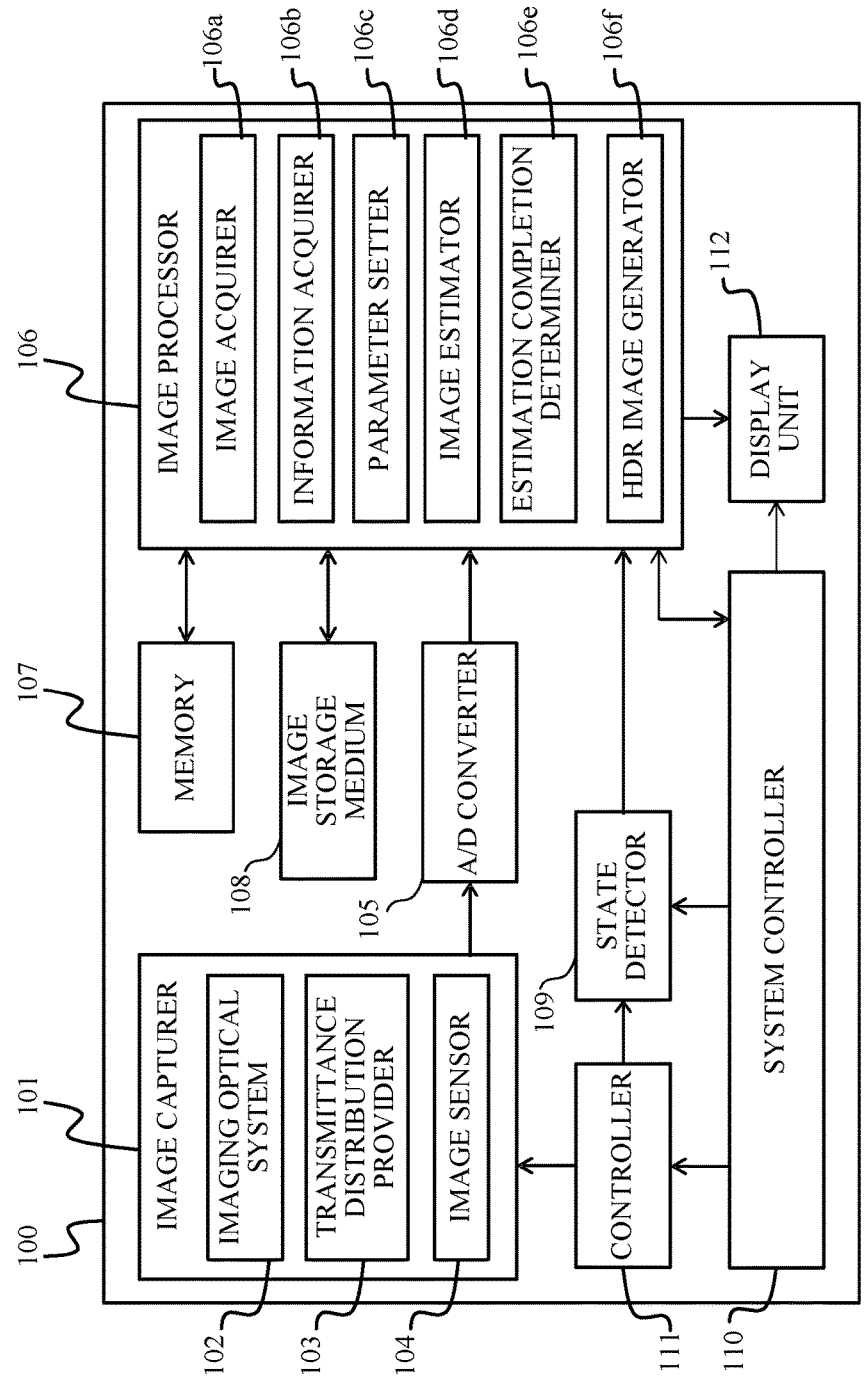
FIG. 2A is a block diagram of a configuration of an image capturing apparatus according to the first embodiment.
Figure 2B:
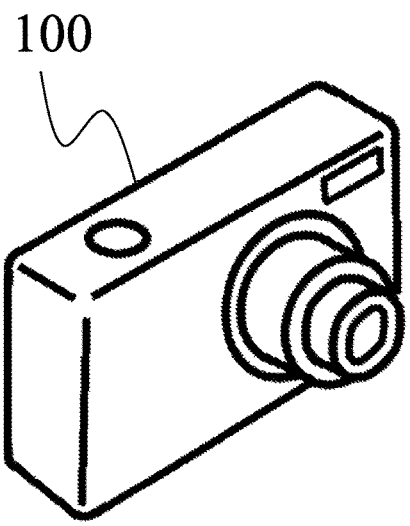
FIG. 2B is an overview of the configuration of the image capturing apparatus according to the first embodiment.

FIGS. 2A and 2B illustrate a configuration and an overview of an image capturing apparatus 100 that includes an image processing apparatus according to the first embodiment. This embodiment characteristically provides, through a space division, different transmittance distributions corresponding to light intensity distributions with a plurality of exposures.

Light from the object space enters an image capturer 101. The image capturer 101 includes an imaging optical system 102 configured to form an optical image (object space image) by condensing the light from the object space, a transmittance distribution provider 103, and an image sensor 104 in which a plurality of pixels are arranged. The image sensor 104 is a photoelectric conversion element, such as a CCD sensor and a CMOS sensor. The transmittance distribution provider 103 will be described in detail later.

The light (object space image) that has passed the imaging optical system 102 before image capturing is received by the image sensor 104, which in turn performs photometry so as to measure a light amount distribution in the object space. A controller 111 that has received a photometry result controls the exposure and image capturing in the image capturer 101. The exposure is controlled by controlling at least one of an F-number and a shutter speed in the imaging optical system 102, and an ISO speed of the image sensor 104.

An analog image signal obtained by capturing the object image in the image sensor 104 is converted into a digital image signal by an A/D converter 105 and input to an image processor 106. The image processor 106 generates a captured image by performing a predetermined process, such as a noise reduction, for the digital image signal, and stores the captured image in a predetermined format in an image storage medium 108, such as a semiconductor memory. Information of an image capturing condition obtained by a state detector 109 is also stored. The image capturing condition contains an image capturing distance and exposure for image capturing, and a focal length when the imaging optical system 102 includes a zoom lens, etc. The state detector 109 may acquire the information of the image capturing condition from a system controller 110, and may obtain information on the image capturer 101 from the controller 111.

The captured image (input image) stored in the image storage medium 108 is an image in which a plurality of exposures are combined or (which contains information on a plurality of combined light intensity distributions) provided with different transmittance distributions by the transmittance distribution provider 103. In displaying the image on the display unit 112, the image processor 106 separates and generates estimated images that is an image corresponding to a different exposure, by performing the following image processing for the input image. A high dynamic range image (referred to as an "HDR image" hereinafter) is generated based on those estimated images in which a dynamic range is enlarged, and the HDR image is displayed on the display unit 112.

The image processor 106 includes an image acquirer 106a, an information acquirer 106b, a parameter setter 106c, an image estimator 106d, an estimation completion determiner 106e, and an HDR image generator 106f. Image processing performed by the image processor 106 will be described in detail later. In the image processing, information of the transmittance distribution provided by the transmittance distribution provider 103 stored in the memory 107 is read out and used. The image displayed on the display unit 112 may be stored in the image storage medium 108. For accelerated image displaying, the input image obtained by the image sensor 104 may not be stored in the image storage medium 108, and may be directly processed.

The system controller 110 controls a series of operations and processes described above. The controller 111 controls mechanical driving of the image capturer 101 in accordance with a command from the system controller 110.

Figure 3:
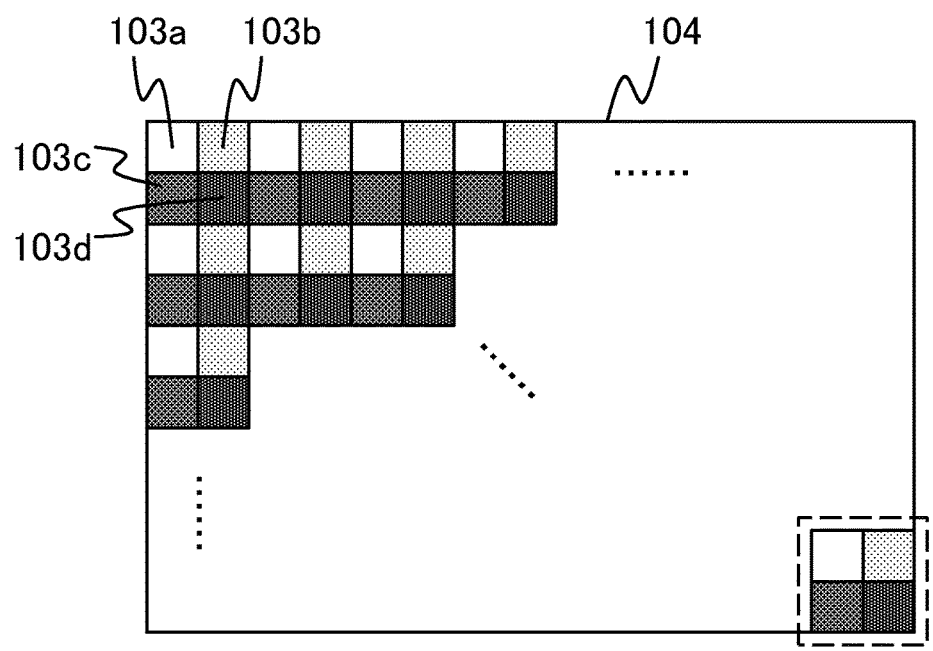
FIG. 3 is a view for explaining a transmittance distribution provider according to the first embodiment.

Referring now to FIG. 3, a description will be given of the transmittance distribution provider 103 according to this embodiment. The transmittance distribution provider 103 is a light attenuation filter provided on the image sensor 104. As illustrated in FIG. 3, the transmittance distribution provider 103 provides four types of transmittances to pixels 103a to 103d in the image sensor 104. Illustrated concentrations represent a magnitude of the transmittance. The transmittance provided by the transmittance distribution provider 103 to the pixel 103a is $t_{103a}=1.0000$, and the transmittance provided to the pixel 103b is $t_{103b}=0.1248$. The transmittance provided to the pixel 103c is $t_{103c}=0.0154$, and the transmittance provided to the pixel 103d is $t_{103d}=0.0017$.

A region having the same transmittance (such as a region corresponding to the pixel 103a) in the transmittance distribution provider 103 corresponds to one pixel in the image sensor 104, and regions having the four types of transmittances are periodically arranged in the transmittance distribution provider 103. The values, types, and arrangement of the transmittances illustrated in FIGS. 4A and 4B are merely illustrative, and may have other values, types, and arrangement of the transmittances.

Next follows a description of the input image as the captured image obtained with the image sensor 104. The following expression (1) represents the input image s(x, y) as follows.

$$s(x, y) = \sum_{k=1}^{K} t_k(x, y) I_k(x, y) + \eta(x, y) \quad (1)$$

Herein, x and y coordinates in lateral and vertical directions, and $\eta(x, y)$ represents a noise. K is the number of exposures to be combined, and K=4 in this embodiment. $I_k(x, y)$ is a light intensity distribution in the object space image to which the transmittance distribution is not provided in a k-th exposure in a plurality of exposures. Moreover, $t_k(x, y)$ is a transmittance distribution for $I_k(x, y)$, and $t_k(x, y)I_k(x, y)$ is a light intensity distribution in the object space image to which the transmittance distribution is provided, in the k-th exposure. Herein, k=1, 2, 3, and 4 are set in order from lower (darker) exposure. In this embodiment, a light amount ratio $r_k$ of another exposure to a minimum exposure of k=1 is set to $r_1=1$, $r_2=8$, $r_3=64$, and $r_4=512$. For example, $r_2=8$ means that a light amount with an exposure of k=2 is eight times as large as that of k=1.

FIGS. 4A, 4B, 5A and 5B illustrate a transmittance distribution $t_k$ provided to each of the exposures of k=1 to 4 in the transmittance distribution provider 103. The light intensity distribution with the largest (brightest) exposure of k=4 is obtained by image capturing only with the pixel having the transmittance $t_{103a}$, but the light intensity distribution with the lowest exposure of k=1 is obtained by image capturing with all pixels. In other words, for example, in the pixel 103a, the light intensity distributions obtained with four types of exposures are combined (superimposed) and obtained.

A total of the transmittance distributions $t_k(x, y)$ with respect to k is 1 for all (x, y). Herein, the transmittance provided to each pixel by the transmittance distribution provider 103 is determined by two factors, i.e., the transmittance distribution $t_k$ provided to each exposure and the transmittance (determined by the light amount ratio $r_k$) for controlling each of the exposures of k=1 to 4. For example, in the pixel 103d in FIG. 3, information on the darkest exposure of k=1 is obtained. The transmittance of the transmittance distribution provider 103 to the pixel 103d is expressed as follows where $(x_{103d}, y_{103d})$ represents a coordinate of the pixel 103d.

$$t_{103d} = t_1(x_{103d}, y_{103d}) \times r_1/(r_1+r_2+r_3+r_4)$$

The following expression is obtained by substituting $t_1(x_{103d}, y_{103d})=1.0000$ and $r_1=1$, $r_2=8$, $r_3=64$, and $r_4=512$ for the above expression, $t_{103d}=1.0000\times1/(1+8+64+512)$, which is equal to the value of the transmittance of the pixel 103d.

$$t_{103d} = 1.0000 \times 1/(1+8+64+512) = 0.0017$$

In the pixel 103c, the exposure of k=1 is combined with the exposure of k=2. The following expression is established, which is equal to the transmittance of the pixel 103c.

$$t_{103c} = \{t_1(x_{103c}, y_{103c}) + t_2(x_{103c}, y_{103c})\} \times (r_1+r_2)/(r_1+r_2+r_3+r_4) = 0.0154$$

This is similarly applicable to the pixels 103a and 103b.

The expression (1) can be rewritten as follows using a matrix format.

$$s = Hi + \eta \quad (2)$$

Herein, "s" denotes a vectorized image (referred to as an "input image vector" hereinafter) obtained by the image sensor 104, and "i" denotes a vectorized light intensity distribution obtained with each exposure (referred to as a "light intensity distribution vector" hereinafter). η denotes a vectorized noise (referred to as a "noise vector" hereinafter). H denotes a matrix representing provisions of transmittance distributions to light intensity distributions with a plurality of exposures and a superimposition.

The light intensity distribution vector i is a column vector having, as a component, the light intensity distribution vector $i_k$ obtained with the k-th exposure, as expressed in the following expression (3).

$$i = \begin{pmatrix} i_1 \\ i_2 \\ \vdots \\ i_K \end{pmatrix} \quad (3)$$

When the light intensity distribution $I_k(x, y)$ obtained with the k-th exposure has an M×N component, $i_k$ is a column vector having a MN×1 component expressed by the following expression (4).

$$i_k = \begin{pmatrix} I_k(x_1, y_1) \\ I_k(x_2, y_1) \\ \vdots \\ I_k(x_M, y_1) \\ I_k(x_1, y_2) \\ \vdots \\ I_k(x_M, y_N) \end{pmatrix} \quad (4)$$

When the input image vector s and the noise vector η have column vectors having a MN×1 component and are expressed as follows.

$$s = \begin{pmatrix} s(x_1, y_1) \\ s(x_2, y_1) \\ \vdots \\ s(x_M, y_N) \end{pmatrix} \quad (5)$$

$$\eta = \begin{pmatrix} \eta(x_1, y_1) \\ \eta(x_2, y_1) \\ \vdots \\ \eta(x_M, y_N) \end{pmatrix} \quad (6)$$

The matrix H is a matrix having a MN×KMN component provided as follows.

$$H = (G_1 G_2 \ldots G_K) \quad (7)$$

$G_k$ is a matrix having a MN×KMN component expressed as follows.

$$G_k = \begin{pmatrix} t_k(x_1, y_1) & 0 & 0 & \ldots & 0 & 0 \\ 0 & t_k(x_2, y_1) & 0 & \cdots & 0 & 0 \\ & & & \vdots & & \\ 0 & 0 & 0 & \ldots & 0 & t_k(x_M, y_N) \end{pmatrix} \quad (8)$$

Since this embodiment superimposes a plurality of light intensity distributions obtained with a plurality of exposures without position shifts, the matrix $G_k$ has a diagonal component as in the expression (8). However, when these plurality of light intensity distributions shift from one another when superimposed, the expression (8) has a finite value in a nondiagonal component according to the position shift amount.

Referring now to a flowchart illustrated in FIG. 1, a description will be given of image processing performed by the image processor 106. The image processor 106 as an image processing computer executes image processing in accordance with an image processing program as a computer program. The image processor 106 performs the image processing, and separates image signals corresponding to two or more exposures from the input image (first image) in which a plurality of exposures provided with different transmittance distributions are combined. Then, the image processor 106 generates two or more estimated images (second images) corresponding to two or more exposures using the separated image signals.

In the step S101, the image acquirer (first acquirer) 106a acquires the input image. The input image is an image captured by the image sensor 104 or s(x, y) expressed by the expression (1). In the input image, four exposures (light intensity distributions) provided with four different transmittance distributions are combined in this embodiment.

In the next step S102, the information acquirer (second acquirer) 106b acquires information on the four transmittance distributions provided by the transmittance distribution provider 103. The information on the transmittance distributions may be $t_k(x, y)$ expressed by the expression (1), or information based on which $t_k$ can be calculated, such as information on the transmittance ($t_{103a}$ to $t_{103d}$) of the transmittance distribution provider 103 and the light amount ratio $r_k$ between the exposures.

In the next step S103, the parameter setter 106c sets a parameter used for the estimation. The parameter may contain a regularization term, which will be described in the next step, and its weight, the number of repetitive operations, and a convergence condition used in the step S105. The parameter may also contain the number of estimated images to be generated by the estimation, a condition, etc. The number of estimated images generated by the estimation may be four corresponding to the number of exposures combined in the input image or less. An estimated image in which at least two exposures out of four exposures are combined may be generated. In this case, the corresponding transmittance distribution is a weighted average of the transmittance distributions provided to two exposures to be combined. This embodiment generates all of four estimated images corresponding to four exposures.

Next, in the step S104, the image estimator 106d generates estimated images. The estimated images correspond to images made by observing (or capturing) the object space with four exposures. In order to obtain the estimated image, the light intensity distribution vector i obtained with each exposure is found based on the input image vector s and the matrix H in the expression (2). It is understood from the expressions (1) and (2) that this step corresponds to solving simultaneous linear equations. The number of simultaneous equations (row number in the matrix H) is MN although the number of unknowns (row number of the light intensity distribution vectors i) is KMN. The number of unknowns is (K+1)MN when an unknown noise is considered. Thus, the solution is not uniquely determined, and the estimation process is inevitable so as to obtain the light intensity distribution vector i.

Without the estimation process, the light intensity distribution vector i can be found by lowering the resolution of the image (row number of the light intensity distribution vector i). In other words, the number of simultaneous equations (row number MN in the matrix H) may be multiplied by the number of unknowns (row number of the light intensity distribution vector i). In this case, the resolution of the image with each exposure is reduced from M×N to (M/K$^{0.5}$)×(N/K$^{0.5}$). This means that values of $I_k(x, y)$ in four pixels enclosed by a broken line in FIG. 3 are set to equal values. Since four light intensities (unknowns) $I_k(x, y)$ are added to different transmittances (coefficients) in the four pixels enclosed by the broken line, four simultaneous linear equations are obtained. When each linear equation is independent (or when the transmittance distribution is provided so that each linear equation is independent), the number of equations accords with the number of unknowns and thus the light intensity distribution vector i as a solution is determined. However, this method causes the resolution to be lowered to the same extent as that of PLT2. Accordingly, this embodiment obtains estimated images corresponding to a plurality of exposures through the estimation process while preventing the resolution from deteriorating.

The estimated image corresponding to the image obtained by capturing the object space with each exposure is generated by solving the optimization problem expressed by the following expression (9).

$$\underset{v}{\operatorname{argmin}}[L(Hv) + \Phi(v)] \tag{9}$$

Herein, v is a vectorized estimated image (referred to as an "estimated image vector" hereinafter), L is a loss function, and Φ is a regularization term to an estimated image vector v. A concrete example of each symbol will be described later.

The loss function L has an effect of fitting a solution to a model (simultaneous equation of the expression (2)). As described above, since the number of equations is smaller than the number of unknowns in the simultaneous equation of the expression (2), the solution is not uniquely determined. Thus, this embodiment utilizes the regularization term Φ that converges the solution to a reasonable value. The regularization term has a nature of a solution (light intensity distribution vector i) called prior knowledge. The regularization term serves to prevent excessive fitting caused only by the loss function (or the influence of the noise vector η from being reflected on the estimated image vector v).

The estimated image vector v is a column vector having, as a component, the estimated image vector $v_k$ with the k-th exposure, as in the following expression.

$$v = \begin{pmatrix} v_1 \\ v_2 \\ \vdots \\ v_K \end{pmatrix} \tag{10}$$

If it is assumed that $V_k(x, y)$ is an estimated image to the k-th exposure, the estimated image vector $v_k(x, y)$ is a column vector having a MN×1 component expressed by the following expression, similar to the expression (4).

$$v_k = \begin{pmatrix} V_k(x_1, y_1) \\ V_k(x_2, y_1) \\ \vdots \\ V_k(x_M, y_N) \end{pmatrix} \tag{11}$$

Concrete examples of the loss function and regularization term in the expression (9) will be given. One conceivable loss function may be a function expressed by the following expression (12).

$$L(Hv) = \tfrac{1}{2}\|Hv - s\|_2^2 \tag{12}$$

The symbol expressed in the following expression (13) represents a p-norm (p-th order average norm), which is a Euclidean norm when p is 2.

$$\|\cdot\|_p \tag{13}$$

A 1-norm (first order average norm) expressed by the following expression (14) is an illustrative regularization term.

$$\Phi(v) = \lambda \sum_{k=1}^{K} \|\Psi v_k\|_1 \tag{14}$$

Herein, λ is a parameter representing a weight of the regularization term. Ψ is a matrix representing a base conversion to an image, such as a wavelet transformation and a discrete cosine transform. The regularization term of the expression (14) has a characteristic in that a signal component is sparse or can be expressed by a smaller number of signals because the base conversion, such as a wavelet transformation and a discrete cosine transform, is performed for the image. For example, Reference Literature 1 describes this characteristic in detail.

Reference Literature 1

Richard G. Baraniuk, "Compressive Sensing," IEEE SIGNAL PROCESSING MAGAZINE [118] JULY 2007

The expression (14) uses the same weight λ for each exposure, but may use a different weight according to k.

A Tikhonov regularization term or TV (Total Variation) norm regularization term expressed by the following expressions (15) and (16) may also be used.

$$\Phi(v) = \lambda \|v\|_2^2 \tag{15}$$

$$\Phi(v) = \lambda \sum_{k=1}^{K} \|\nabla v_k\|_{TV} = \lambda \sum_{k=1}^{K} \sqrt{(\partial_x V_k)^2 + (\partial_y V_k)^2} \tag{16}$$

Herein, $\partial_x V_k$ and $\partial_y V_k$ are primary differentiations in the x and y directions of the estimated image $V_k$.

In order to solve the estimated expression (9) as the optimization problem, a method using a repetitive calculation is employed. For example, when the expression (15) is used for the regularization term, a conjugate gradient method, etc. is applicable. When the expression (14) or (16) is used for the regularization term, TwIST (Two-step Iterative Shrinkage/Thresholding) etc. may be used. Reference Literature 2 describes TwIST in detail.

Reference Literature 2

J. M. Bioucas-Dias, et al., "A new TwIST: two-step iterative shrinkage/thresholding algorithms for image restoration," IEEE Trans. on Image Processing, vol. 16, December 2007

The regularization term may be used which contains a difference between first and second estimated images corresponding to first and second exposures among the plurality of exposures in an evaluation value. Since the same object space is captured with each exposure (image capturing), the same shape is obtained except for a shadow part and a highlighted part in which information is lost in only one of two estimated images. In other words, when the luminance between the first and second images is equalized and a difference between these images is calculated, the value becomes very small except for the shadow part and the highlighted part. Therefore, the estimated images corresponding to a plurality of exposures can be highly precisely generated by estimating the estimated image so that the difference can be small.

The first and second estimated images between which the difference is calculated may be estimated images corresponding to the first and second exposures that are closest to each other. Regions in each of which information of the object space is correctly acquired can provide a very small difference between the two estimated images. In other words, the difference is large in the shadow part or the highlighted part in which information is included only in one of the two estimated images due to the underexposure or the luminance saturation. However, this problem can be solved or mitigated by selecting the first and second estimated image corresponding to the exposures that are close to each other.

The following expression (17) or the like is a concrete example of the regularization term in which the difference between the first and second estimated images is addressed.

$$\Phi(v) = \sum_j \lambda_j \sum_{k=1}^{K-1} \left\| \frac{r_{k+1}}{r_k} \partial_j V_k - \partial_j V_{k+1} \right\|_1 \quad (17)$$

Herein, $\partial_j$ denotes a differential operator. $\partial_0$ (j=0) is an identity operator, $\partial_x$ and $\partial_y$ represent differentiations in the lateral and longitudinal directions of the image. A high order differentiation is expressed like $\partial_{xx}$ and $\partial_{xy}$, but this embodiment considers only j=x, y.

The following expression (18) may be used instead of the expression (17).

$$\Phi(v) = \lambda \sum_{k=1}^{K-1} \sum_{j=x,y} \|(\partial_j V_k) \cdot V_{k+1} - V_k \cdot (\partial_j V_{k+1})\|_1 \quad (18)$$

Since the expression (18) differentiates one of the first and second estimated images $V_k$ and $V_{k+1}$ and calculates a product, a brightness adjusting coefficient ($r_{k+1}/r_k$ in the expression (17)) is unnecessary.

In order to solve the estimated expression (9) using the expression (17) or (18), for example, the method disclosed in the following Reference Literature 3 may be used.

Reference Literature 3

F. Heide, et al., "High-Quality Computational Imaging Through Simple Lenses," ACM Trans. Graph. (Proc. SIGGRAPH 2013) 32(5), 2013

While this embodiment recites some regularization terms, a combination of a plurality of regularization terms may be used. In addition, in optimizing the expression (9) using the repetitive operation, a parameter, such as a weight $\lambda$ in the regularization term, may be updated for each repetition.

A plurality of estimated images representing the light intensity distributions in the object space with a plurality of exposures can be obtained by utilizing the solution of the optimization problem, as described above.

Next in the step S105, the estimated completion determiner 106e determines whether the estimated images generated in the steps S104 satisfy the known condition. The known condition is, for example, that the repetitive operation in the step S104 has been performed a predetermined number of times or more or that a change of the estimated image updated by the repetitive operation reaches a predetermined value or less. When the condition is satisfied, the flow moves to the step S106. On the other hand, when the condition is not satisfied, the flow returns to the step S104 and the estimated images are estimated by incrementing the number of repetitive operations.

In the step S106, the HDR image generator 106f generates an HDR image using a plurality of (or four) estimated images. As long as the HDR image is generated based on two or more estimated images, the number of estimated images is not limited to four.

The above image processing can prevent a data amount from increasing and the resolution from lowering, and generate a plurality of estimated images corresponding to a plurality of different exposures based on the input image obtained by the image sensor 104.

Next follows a description of an illustrative condition in the above image processing. A light intensity distribution obtained with a maximum (brightest) exposure among a plurality of exposures combined with the input image may be obtained with a transmittance distribution having an average value smaller than that of the light intensity distribution obtained with a minimum (darkest) exposure. The light intensity distribution with the maximum exposure is wholly higher than a light intensity distribution with another exposure, and is likely to cause a luminance saturation. This embodiment separates image signals corresponding to a plurality of exposures combined in one pixel, but when information of the image signal corresponding to the exposure cannot be correctly acquired due to the luminance saturation, the estimation precision of the image signal significantly lowers. On the contrary, the light intensity distribution with the minimum exposure is likely to cause underexposure, but the problem associated with the luminance saturation does not occur because the value of the image signal falls within a dynamic range even when a light intensity distribution with another exposure is combined with the pixel having the underexposure. Hence, the transmittance distribution may be set so as to reduce a region that is likely to cause the luminance saturation. More specifically, an average value $t_{ave}$ (k=K) of the transmittance distribution that provides the light intensity distribution with the maximum exposure may be set smaller than the average value $t_{ave}$ (k=1) of the transmittance distribution that provides the light intensity distribution with the minimum exposure.

In addition, the average value $t_{ave}$ (k) of each of the transmittance distributions that provide light intensity distributions obtained with a plurality of exposures may monotonically decrease as the exposure increases. As described above, a light intensity distribution with a high exposure is likely to cause a luminance saturation, and lower the estimation precision of the estimated image. Thus, a smaller average value of the provided transmittance distribution may be set to a larger exposure. More specifically, the condition of the following expression (19) may be satisfied.

$$0 < \frac{t_{ave}(k+1)}{t_{ave}(k)} \leq 1 \quad (k = 1, 2, \ldots, K-1) \quad (19)$$

The upper limit value of the expression (19) is a condition that the average value $t_{ave}$ (k) of the provided transmittance distribution monotonically decreases as the exposure increases. The value could not exceed the lower limit value unless the average value $t_{ave}(k+1)$ of the numerator is 0, and the numerator of 0 is removed from the condition since the information of the exposure is not obtained.

The light intensity distribution obtained with the maximum exposure may be obtained with a transmittance distribution that includes an area of a region having a transmittance of 0.1 or smaller, larger than that for the light intensity distribution obtained with the minimum exposure. This configuration can prevent the estimation precision from lowering due to the luminance saturation described above. In this embodiment, the area of the region with the transmittance of 0.1 or smaller in the transmittance distribution (FIG. 5B) provided to the maximum exposure is ¾ as large as the image sensor 104. On the other hand, the area of the region with the transmittance of 0.1 or smaller in the transmittance distribution (FIG. 4A) provided to the minimum exposure is ½ as large as the image sensor 104 and thus the maximum exposure has a larger area.

Moreover, the light intensity distribution obtained with the maximum exposure may be obtained with a transmittance distribution having an area of a region having a transmittance of 0.01 or smaller, larger than that for the light intensity distribution obtained with the minimum exposure. This configuration can more effectively prevent the estimation precision from lowering due to the luminance saturation.

The average value $t_{ave}(k)$ of the transmittance distribution provided to the k-th exposure may satisfy a condition in the following expression (20).

$$0.5 \le \frac{t_{ave}(k_1)}{t_{ave}(k_2)} \le 2 \ (k_1, k_2 = 1, 2, \ldots, K) \tag{20}$$

As described above, in order to prevent the estimation precision of the estimated image from lowering due to the luminance saturation, an average value of a transmittance distribution provided to a high exposure may be reduced. However, this configuration may cause an excessively large difference of the resolution between the estimated images, if the difference of the average value of the transmittance distribution between the exposures is excessively large. A small average value of the transmittance distribution means that information on the exposure is less and the resolution of the estimated image lowers due to the less information. Accordingly, the average value of the transmittance distribution may satisfy the condition of the expression (20) so that the difference of the resolution between the estimated images $V_k$ does not become large. When the value exceeds the upper limit value or the lower limit value in the expression (20), the difference of the resolution becomes excessively large.

The difference of the resolution between the estimated images can be more effectively reduced when the upper and lower limit values in the expression (20) are replaced with those in the expression (20a).

$$0.6 \le \frac{t_{ave}(k_1)}{t_{ave}(k_2)} \le 1.7 \ (k_1, k_2 = 1, 2, \ldots, K) \tag{20a}$$

The difference of the resolution between the estimated images can be more effectively reduced when the upper and lower limit values in the expression (20) are replaced with those of the expression (20b).

$$0.7 \le \frac{t_{ave}(k_1)}{t_{ave}(k_2)} \le 1.5 \ (k_1, k_2 = 1, 2, \ldots, K) \tag{20b}$$

In the above step S104, an estimated image can be generated with a high resolution by applying the estimation expressed by the expression (9) to the method that solves simultaneous equations (the method described with FIG. 3 in the same step) while lowering the resolution. In other words, the estimation precision improves even in the processing to which the estimation by the expression (9) is applied on condition that the solution is highly precisely calculated by the method that lowers the resolution and solves the simultaneous equations. This condition is that the simultaneous linear equations are mutually independent, as described above. Accordingly, a vector having, as a component, a transmittance for each k may be as linearly independent as possible in each pixel in a peripheral region that contains a certain pixel $(x_m, y_n)$ (m=1, . . . , M, n=1, . . . , N). Since the transmittance expresses the coefficients of the simultaneous linear equations, the vector will be referred to as a coefficient vector and a matrix in which the coefficient vectors (column vectors) are arranged will be referred to as E. Then, in order to improve the estimation precision of the estimated image, the matrix E may satisfy a condition expressed by the following expression (21).

$$0.5 \le \frac{1}{K} \mathrm{rank}\, E \le 1 \tag{21}$$

With "a" defined in the expression (22), the matrix E is expressed as the following expression (23) in this embodiment.

$$a = \mathrm{ceil}\left(\frac{\mathrm{ceil}(\sqrt{K})-1}{2}\right) \tag{22}$$

$$E = \begin{pmatrix} t_1(x_{m-a}, y_{n-a}) & t_2(x_{m-a}, y_{n-a}) & \ldots & t_k(x_{m-a}, y_{n-a}) \\ t_1(x_{m-a}, y_{n-a+1}) & t_2(x_{m-a}, y_{n-a+1}) & \ldots & t_k(x_{m-a}, y_{n-a+1}) \\ & & \vdots & \\ t_1(x_m, y_n) & t_2(x_m, y_n) & \ldots & t_k(x_m, y_n) \\ & & \vdots & \\ t_1(x_{m+a}, y_{n+a}) & t_2(x_{m+a}, y_{n+a}) & \ldots & t_k(x_{m+a}, y_{n+a}) \end{pmatrix} \tag{23}$$

Herein, "ceil" in the expression (22) denotes a ceiling function. The matrix E is a matrix that includes coefficients of each equation in the method explained with reference to FIG. 3 that reduces the resolution and solves the simultaneous equations, and E is a 9×4 matrix in this embodiment. In other words, the estimation precision improves as a rank of the matrix E is close to K as the number of unknowns per one pixel. Thus, the transmittance distribution may be a distribution that satisfies the condition of the expression (21) for all pixels $(x_m, y_n)$.

In the first embodiment, a plurality of light intensity distributions obtained with a plurality of exposures are superimposed with one another without shifts, and thus each component in the column vector (coefficient vector) in the matrix E has the same coordinate. However, when a plurality of light intensity distributions shift from one another, the coordinates shift accordingly.

The upper and lower limit values of the condition in the expression (21) may be replaced with those expressed in the following expression (21a).

$$0.7 \le \frac{1}{K} \mathrm{rank}\, E \le 1 \tag{21a}$$

The upper and lower limit values of the condition in the expression (21) may be replaced with those expressed in the following expression (21b).

$$0.9 \le \frac{1}{K}\operatorname{rank} E \le 1 \quad (21b)$$

Assume that a total transmittance distribution is a distribution as a sum of the transmittance distributions that provide a plurality of light intensity distributions to be superimposed on the image sensor 104. Then, a minimum value of the total transmittance distribution may be 0 or larger. The total transmittance distribution $t_{sum}$ is expressed by the following expression (24) using the notation expressed by the expression (1).

$$t_{sum}(x, y) = \sum_{k=1}^{K} t_k(x, y) \quad (24)$$

When there is a pixel $(x_m, y_n)$ in which the total transmittance distribution $t_{sum}$ has a value of 0, it means that the light does not enter that pixel at all. As described above, acquiring the estimated image vector v corresponds to estimating the solution of the simultaneous linear equations. When there is a pixel which the light does not enter, all of coefficients (transmittances $t_k$) of the linear equations in that pixel are 0 and the number of simultaneous linear equations reduce. Thus, the minimum value of the total transmittance distribution may be larger than 0 so as not to reduce the number of linear equations.

The (k+1)-th exposure may be at least twice as high as the k-th exposure. This is because even when the light intensity distribution in the object space is acquired with a close exposure, little information of the outside of the dynamic range is obtained and the information cannot be efficiently obtained. A value $\zeta(k)$ of the exposure may be calculated, for example, using the following expression (25).

$$\zeta(k) = \frac{T(k)S(k)t_{max}(k)}{F(k)} \quad (25)$$

Herein, F(k) is an F-number with the k-th exposure, and T(k) is a shutter speed (exposure time period) with the k-th exposure. S(k) is a ISO speed with the k-th exposure, and $t_{max}(k)$ is a maximum value of the transmittance distribution provided to the k-th exposure.

Figure 6:
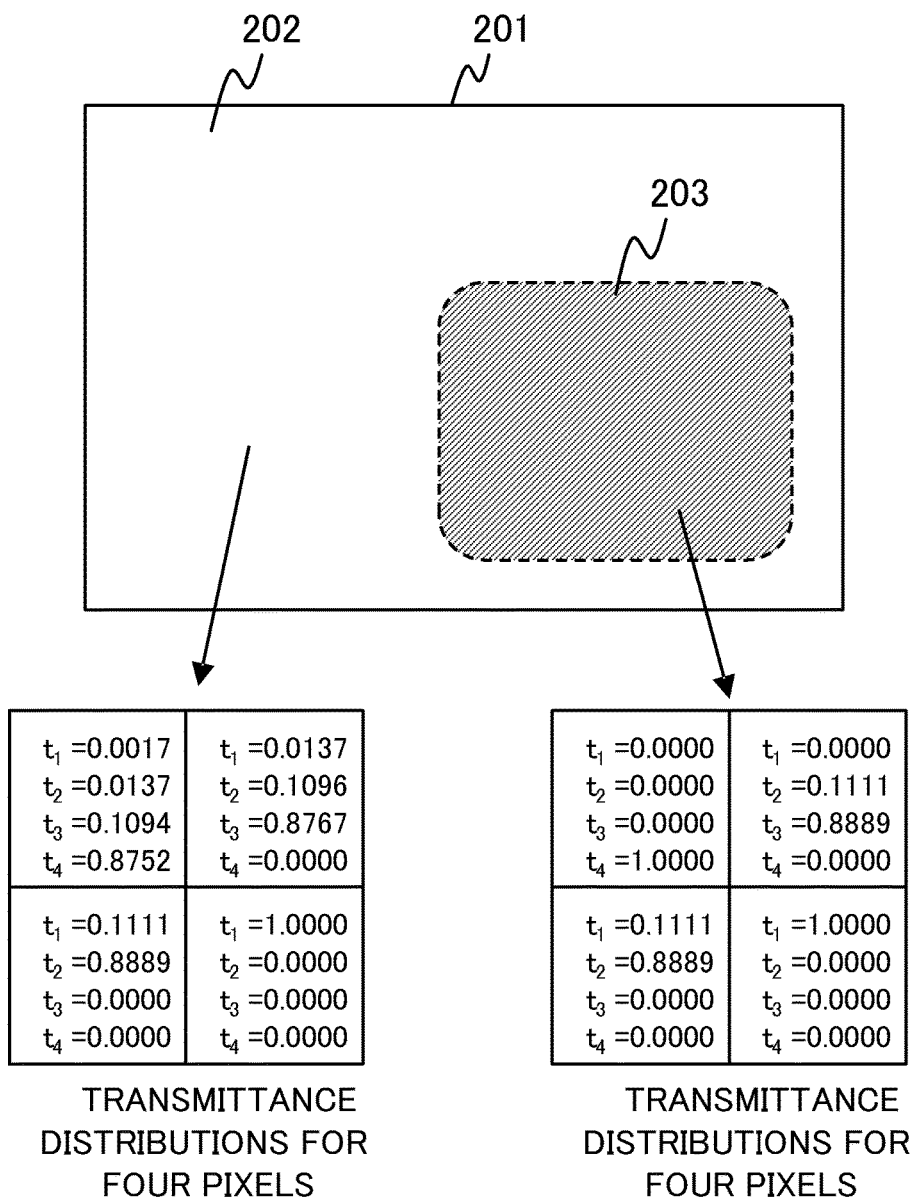
FIG. 6 is a view illustrating a relationship a light amount distribution and a transmittance distribution in an object space according to the first embodiment.

The transmittance distribution provided to a certain exposure may be changed for each region in the input image using information on the light amount distribution in the object space acquired by the photometry before image capturing. Referring now to FIG. 6, an effect will be described. Assume that the captured object space 201 has a shadow (dark) region 203 and another region 202. The estimation expression (9) is solved on the assumption that the transmittance distributions illustrated in FIGS. 4A, 4B, 5A, and 5B are provided to four exposures in the other region 202.

Due to a small light quantity in the shadow region 203, little information is obtained with minimum exposure (k=1). Accordingly, in the shadow region 203, as illustrated in FIG. 6, a value of the transmittance distribution to a small exposure is decreased and a value of the transmittance distribution with a high exposure is increased by that amount. Thereby, in the estimation, a higher resolution of the shadow region 203 can be maintained in the object area. This is applied to a bright highlighted region in the object space 201.

This embodiment changes the transmittance distributions provided to the light intensity distributions with a plurality of exposures rather than each exposure. In other words, a ratio of different exposures combined with the same pixel is changed according to the light amount distribution in the object space. The transmittance distribution $t_k$ may be set so as to prioritize a high exposure in the shadow region and a low exposure in the highlighted region.

This embodiment provides a plurality of exposures with mutually different transmittance distributions using the space division. Therefore, information at the same time can be acquired with no temporal shifts for all exposures.

As described above, this embodiment can realize an image capturing apparatus that can generate a plurality of (two or more) estimated images corresponding to a plurality of exposures while preventing a data amount from increasing and a resolution from lowering.

Example 2

A description will be given of an image processing system according to a second embodiment of the present invention. This embodiment uses different transmittance distributions provided to a plurality of exposures using the time division. This embodiment includes an image capturing apparatus and an image processing apparatus as separate apparatuses.

Figure 7A:
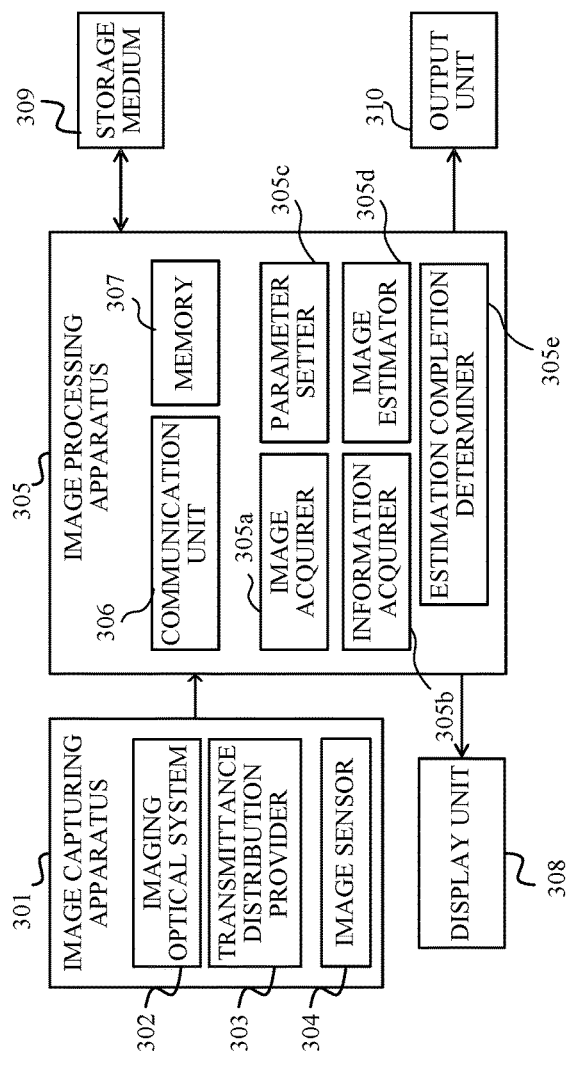
FIG. 7A is a block diagram of a configuration of an image processing system according to a second embodiment.
Figure 7B:
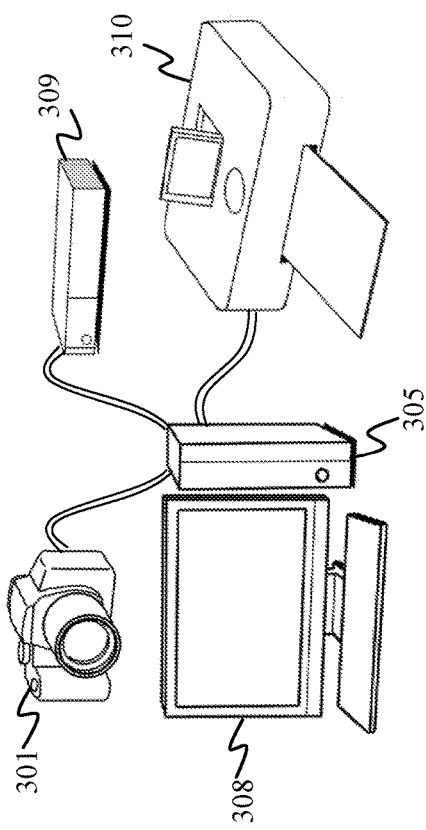
FIG. 7B is an overview of the configuration of the image processing system according to the second embodiment.

FIG. 7A illustrates a configuration of the image processing system according to this embodiment, and FIG. 7B illustrates its overview. An image capturing apparatus 301 includes an imaging optical system 302 configured to condense light from an object space, and to form an optical image (object space image), a transmittance distribution provider 303, and an image sensor 304 in which a plurality of pixels are arranged. The image sensor 304 is a photoelectric conversion element, such as a CCD sensor and a CMOS sensor. A description will be given later of a method for acquiring a captured image (input image) by the image capturing apparatus 301.

The input image is sent to an image processing apparatus 305 via a communication unit 306. The input image is a set of images in which a plurality of exposures (light intensity distributions) provided with different transmittance distributions are combined. Information on the transmittance distributions is stored with the input image in a memory 307 in the image processing apparatus 305. The image processing apparatus 305 includes a personal computer, provides image processing to the input image, and separates and generates estimated images as images corresponding to different exposures based on the input image. In this case, information of the transmittance distribution stored in the memory 307 is used.

The image processing apparatus 305 includes an image acquirer 305a, an information acquirer 305b, a parameter setter 305c, an image estimator 305d, and an estimation completion determiner 305e.

The plurality of estimated images generated by the image processing are output to at least one of a display unit 308, a storage medium 309, and an output unit 310 via the communication unit 306. The display unit 308 may include a liquid crystal display or a projector. The user can confirm an image that is being processed, via the display unit 308, in operating the image processing apparatus 305. The storage medium 309 may be a semiconductor memory, a hard disk drive, a server on a network, etc. The output unit 310 is a printer, etc. The image processing apparatus 305 may serve to provide a necessary process, such as a development process. The user can combine HDR images, and provides a high resolution process for reducing ringing near a luminance saturated region (such as a process using a Wiener filter and a Richardson-Lucy method), using a plurality of estimated images.

The transmittance distribution provider 303 of the image capturing apparatus 301 is disposed near the image sensor 304, and provides mutually different transmittance distributions to the plurality of exposures by switching the transmittance distribution pattern in the exposure time period. A description will be given of an image capturing method that provides mutually different transmittance distributions to a plurality of exposures through the transmittance distribution provider 303, with reference to FIG. 8.

Figure 8:
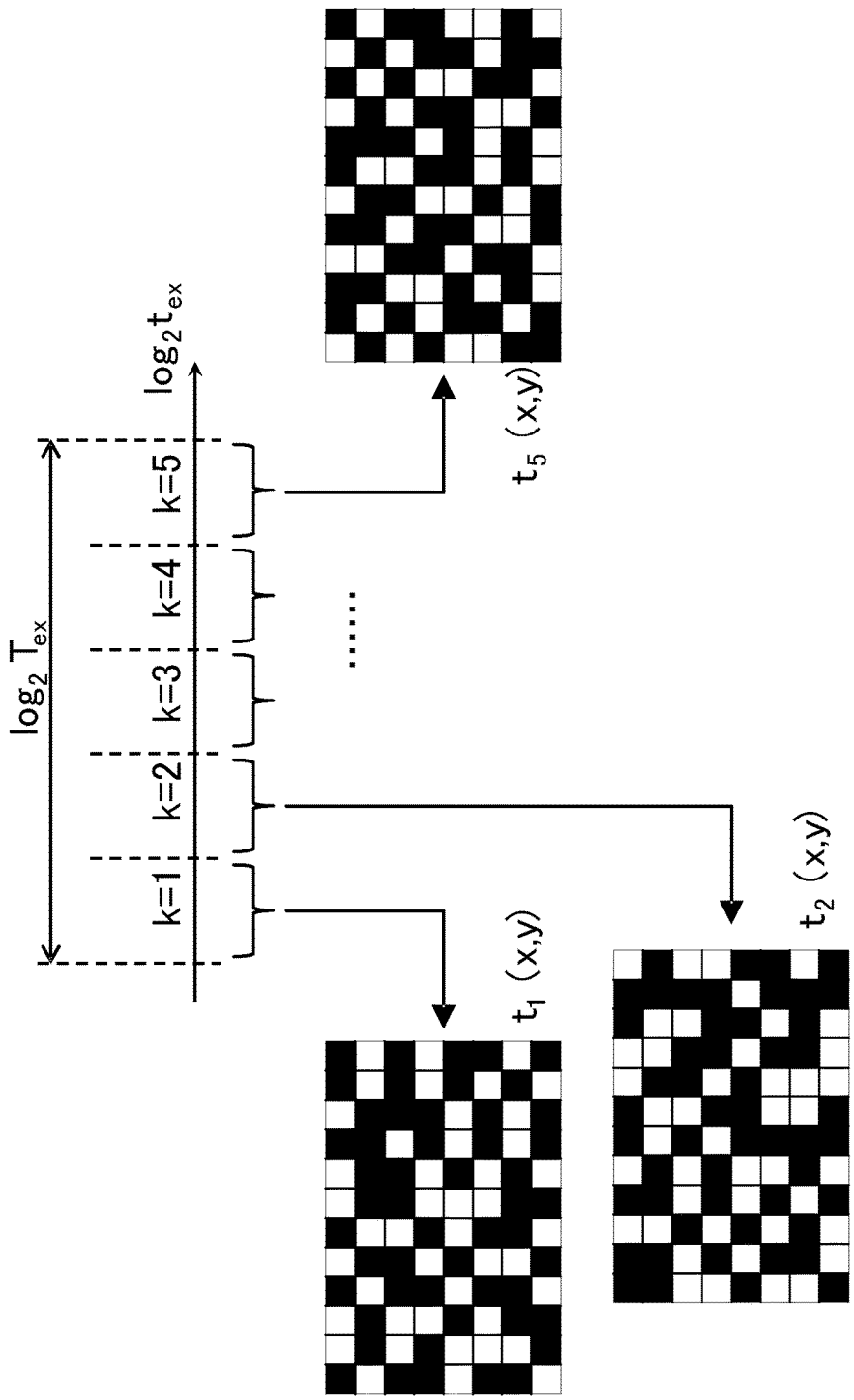
FIG. 8 is a view illustrating switching of a transmittance distribution in the exposure according to the second embodiment.

This embodiment divides a total exposure time period $T_{ex}$ used to obtain the input image into five, and provides a different transmittance distribution $t_k(x, y)$ for each divided time period. FIG. 8 illustrates a logarithm of the exposure time period $t_{ex}$ in the abscissa axis. The number of divisions of the total exposure time period is not limited to five. The exposure time period in each exposure may be or may not be a regular pitch to the logarithm time. The transmittance distribution provided in this embodiment is binary, i.e., 0 or 1, but may have an intermediate value.

In order to change the transmittance distribution $t_k$ according to time, a transmission type LCOS (Liquid Crystal on Silicon) device, for instance, may be used for the transmittance distribution provider 303.

Figure 9:
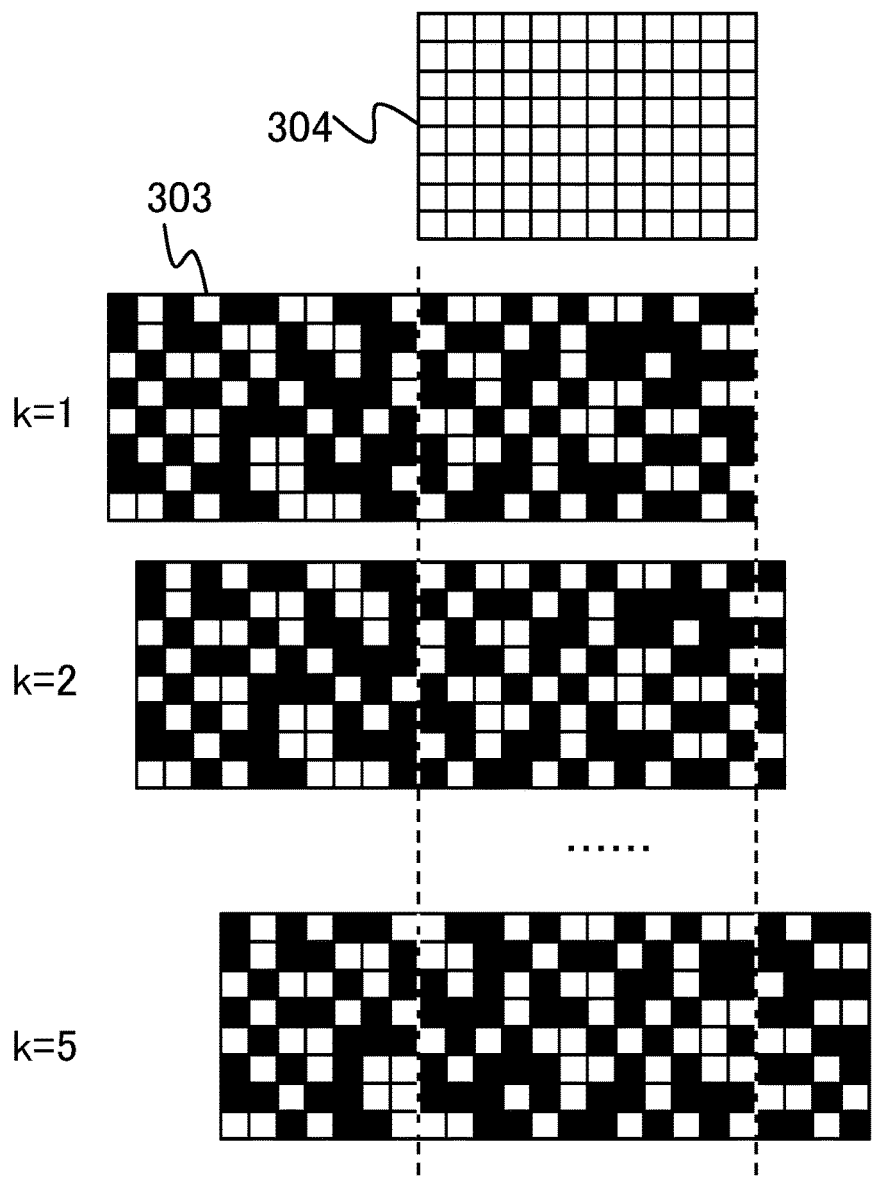
FIG. 9 is a view of an illustrative image capturing method according to the second embodiment.

As illustrated in FIG. 9, this embodiment may use a method for mechanically moving a mask in the exposure time period, in which a transmittance pattern is fixed. When the mask (transmittance distribution provider 303) is temporally moved relative to the image sensor 304, a different transmittance distribution can be provided according to k (=1 to 5).

While this embodiment provides a different exposure by changing an exposure time period for each k, the exposure may be changed using another method. For example, an aperture stop may be narrowed in the imaging optical system 302 in the exposure time period, the ISO speed is changed in the image sensor 304, and a light attenuation filter that temporally changes the transmittance may be used. In addition, these methods may be used singularly or in combination.

Figure 1:
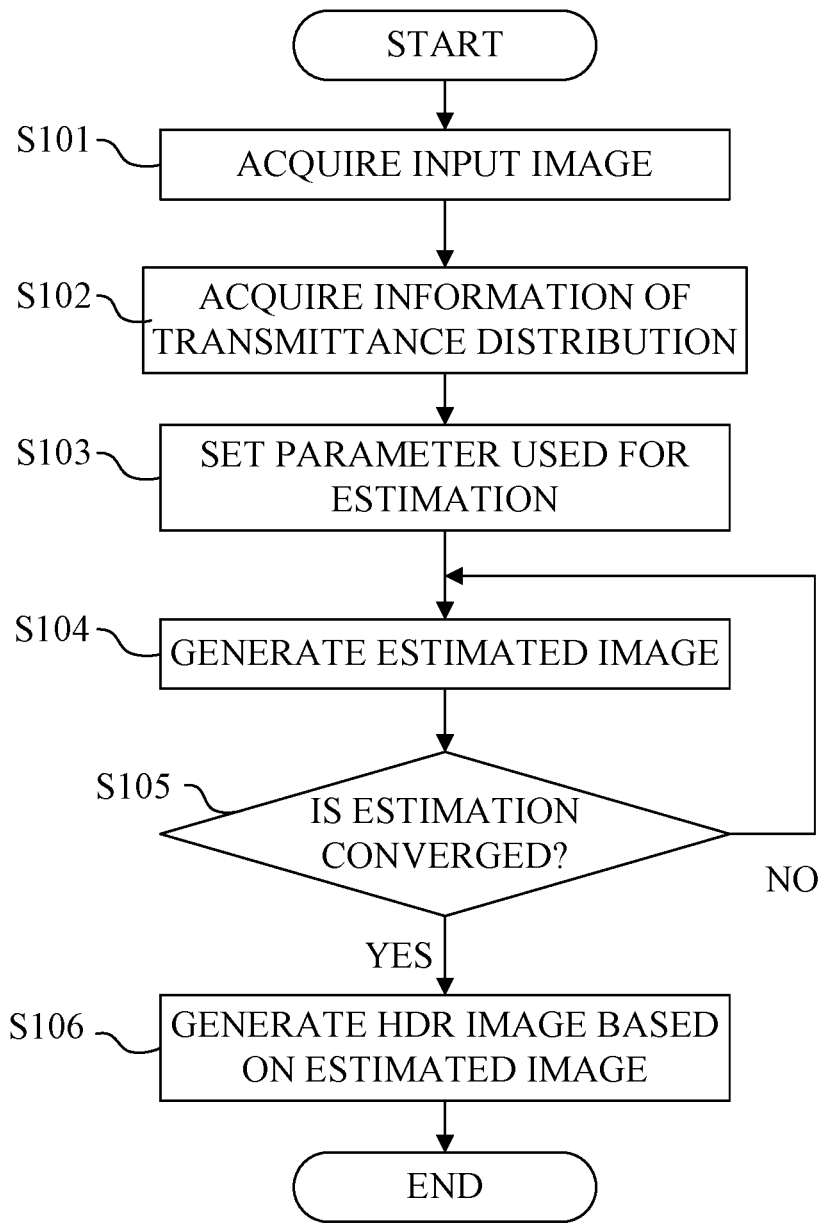
FIG. 1 is a flowchart of image processing according to first to fourth embodiments of the present invention.

The processes performed by the image acquirer 305a, the information acquirer 305b, the parameter setter 305c, the image estimator 305d, and the estimation completion determiner 305e are similar to those of the steps S101 to S105 in FIG. 1, and thus a description thereof will be omitted.

Figure 10:
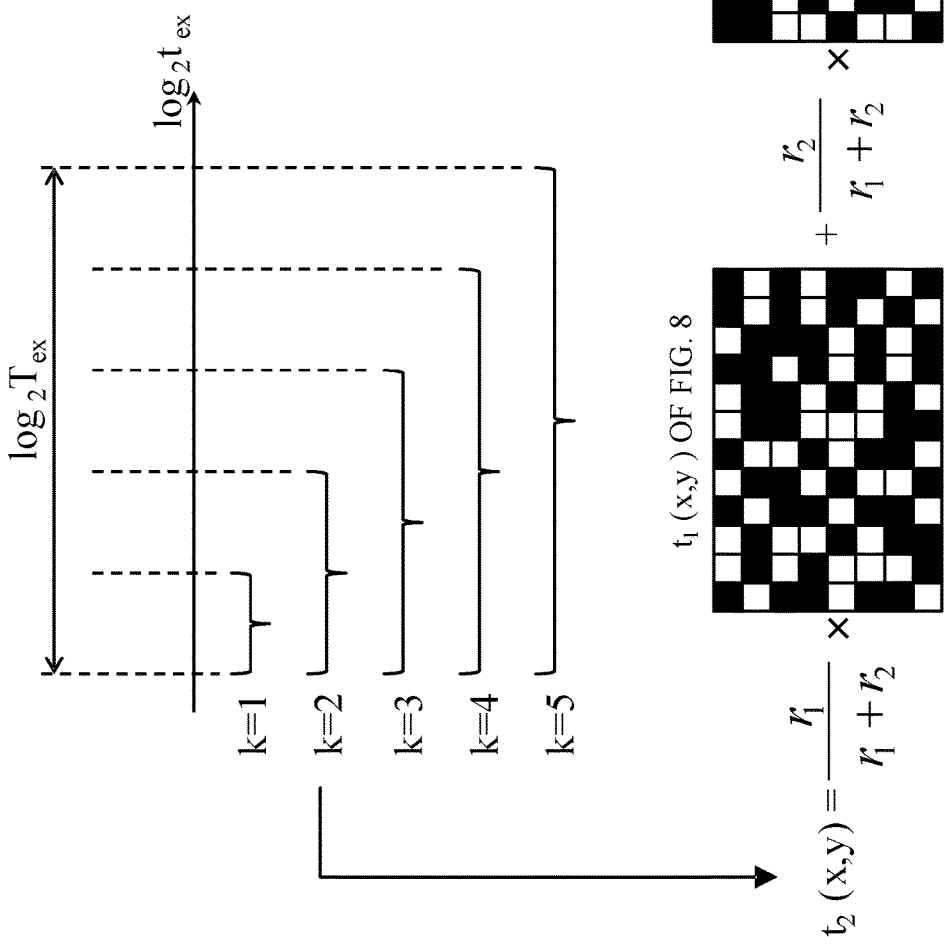
FIG. 10 is an illustrative view about a plurality of images of exposures and a corresponding transmittance distribution according to the second embodiment.

An estimated image corresponding to a different exposure can be generated (estimated) as illustrated in FIG. 10 instead of using the image capturing method illustrated in FIG. 8. In FIG. 10, each exposure is defined on the assumption that an exposure time period of a high exposure contains that of a low exposure. The transmittance distribution $t_k$ provided to a certain exposure is, for example, a temporally weighted average of the transmittance distribution provided in FIG. 8, as illustrated in FIG. 10, when k is 2.

In this embodiment, there is a temporal difference between the exposures so as to differentiate the transmittance differences provided to a plurality of exposures (light intensity distributions) using the time division. Thus, this embodiment is effective in capturing a still object. On the other hand, the first embodiment is more suitable for capturing a moving object.

This embodiment can realize an image capturing apparatus that can generate a plurality of (two or more) estimated images corresponding to a plurality of exposures while preventing a data amount from increasing and a resolution from lowering.

Example 3

A description will be given of an image processing system according to a third embodiment of the present invention. This embodiment makes different transmittance disributions provided to a plurality of exposures using time divisions similar to the second embodiment, but this embodiment is different from the second embodiment in that this embodiment provides the transmittance distribution to each exposure after the light intensity distribution with each exposure is obtained by the image sensor.

Figure 11A:
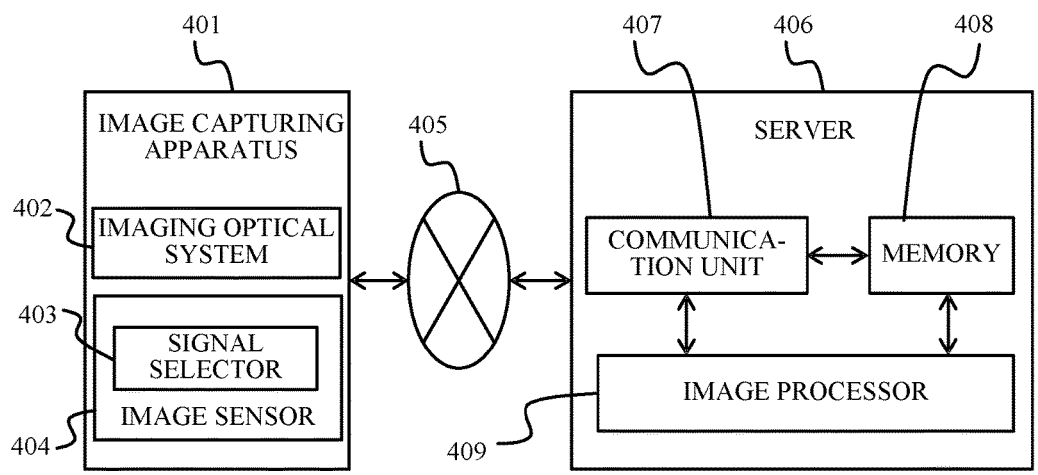
FIG. 11A is a block diagram of a configuration of an image processing system according to a third embodiment.
Figure 11B:
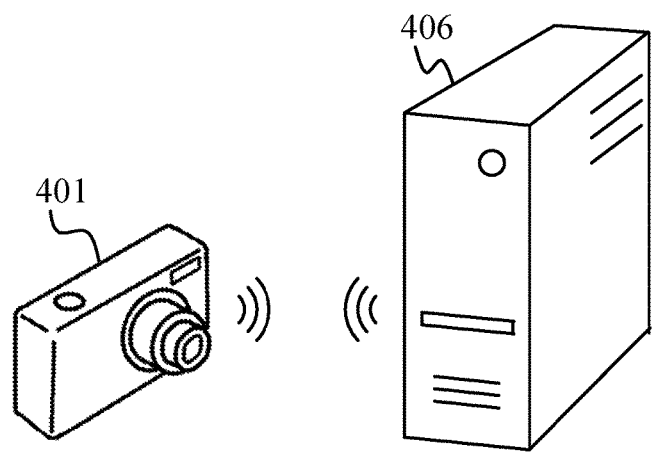
FIG. 11B is an overview of the configuration of the image processing system according to the third embodiment.

FIG. 11A illustrates a configuration of the image processing system according to this embodiment, and FIG. 11B illustrates its overview. A server 406 as the image processing apparatus includes a communication unit 407, and is connected to an image capturing apparatus 401 via a network 405. This connection may be a wire connection or a wireless connection.

The image capturing apparatus 401 includes an imaging optical system 402 configured to condense light from the object space, and to form an optical image (object space image), and an image sensor 404 in which a plurality of pixels are arranged. The image sensor 404 includes a signal selector 403. The signal selector 403 in the image sensor 404 provides mutually different transparent distributions to the image signal generated when the pixel photoelectrically converts a plurality of light intensity distributions (object space images) obtained with a plurality of exposures. A detailed configuration of the image sensor 404 will be described later.

The captured image obtained by the image capturing apparatus 401 is automatically or manually sent to the communication unit 407 in the server 406, and sent as an input image to a memory 408 and an image processor 409 in the server 406. The memory 408 stores information on the transmittance distribution provided by the signal selector 403 with the input image. The image processor 409 generates a plurality of estimated images corresponding to a plurality of exposures through image processing using the input image and the information on the transmittance distribution, and generates an HDR image using the plurality of estimated images. The generated HDR image is stored in the memory 408 or sent to the image capturing apparatus 401 via the communication unit 407.

Next follows a detailed description of the image sensor 404 according to this embodiment. The image sensor 404 has a configuration of a CMOS sensor illustrated in FIG. 12, and includes a pixel arrangement section 421, a vertical scanning circuit section 422, a horizontal scanning circuit section 423, an A/D converter 424, a signal selector 403, a memory 425, and an output section 426. The image sensor 404 according to this embodiment operates in accordance with a timing chart illustrated in FIG. 13.

Figure 12:
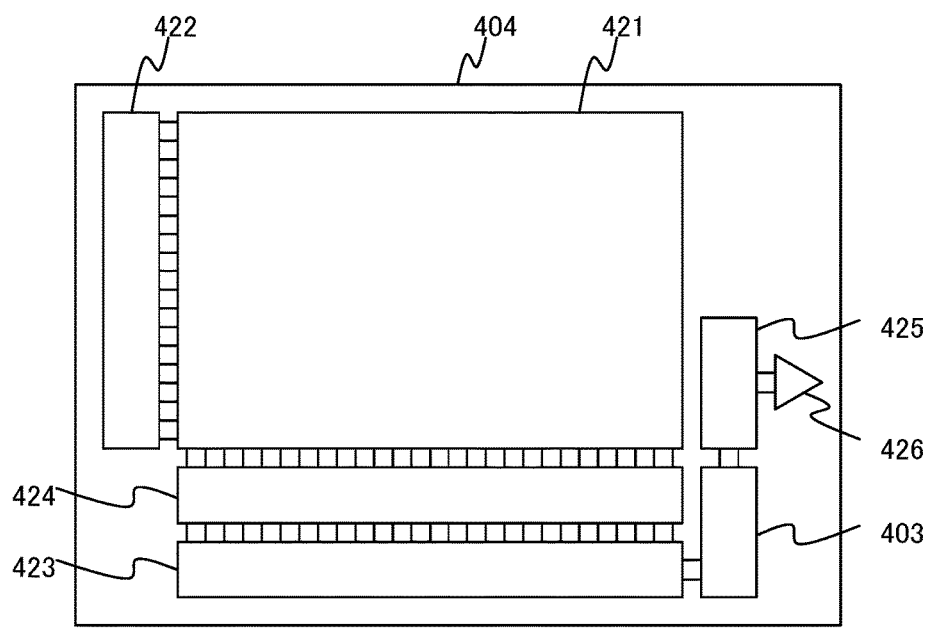
FIG. 12 is a block diagram of a configuration of an image sensor according to the third embodiment.

A plurality of pixels are arranged in the pixel arrangement section 421 illustrated in FIG. 12. The light incident on the pixel in the exposure time period is converted into an analog image signal in each pixel. Herein, each of the plurality of pixels includes a global electronic shutter, and thus the plurality of pixels can be exposed at the same time.

The vertical scanning circuit section 422 and the horizontal scanning circuit section 423 read analog image signals out of a plurality of pixels, and the A/D converter 424 converts the analog image signal into a digital image signal. The digital image signal is input into the signal selector 403.

The signal selector 403 conducts patterning (or selects signals) in accordance with a position of a pixel from which the image signal has been read. This patterning is equivalent to providing a transmittance distribution $t_{k=1}(x, y)$ of 0 or 1 to the image signal. The signal selector 403 may perform a calculation, such as multiplying an image signal by a proportional number, thereby providing a transmittance other than 0 and 1 to an image signal, as well as selecting the image signal (0 or 1). The patterned image signal (image data) is temporarily stored in the memory 425.

Figure 13:
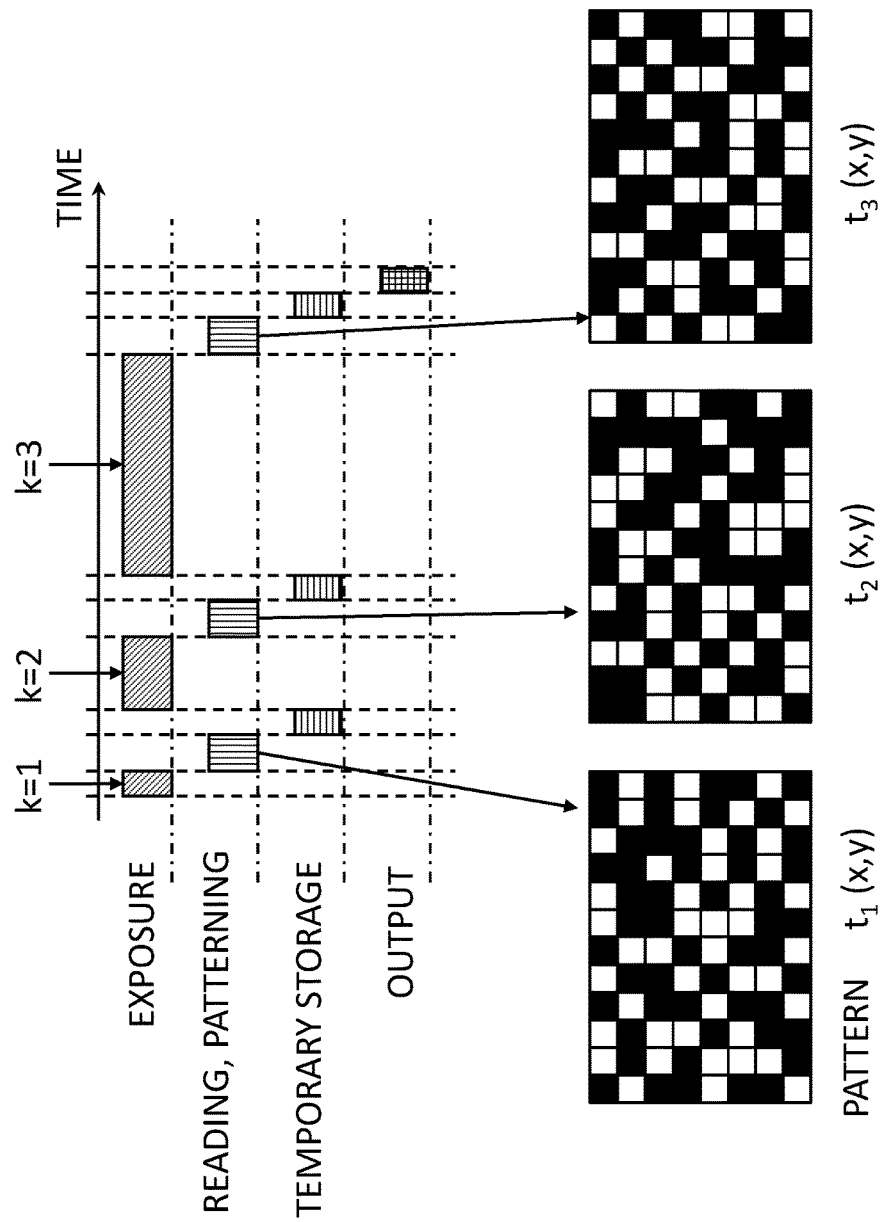
FIG. 13 illustrates an operation flow of the image sensor according to the third embodiment.

Next, a similar process is performed for a different exposure. FIG. 13 illustrates that an exposure time period is different between exposures. In this case, the signal selector 403 performs patterning that provides a different transmittance distribution from that with the previous exposure. The patterned image signal is added to or combined width the image signal previously stored in the memory 425. Therefore, an image data amount does not increase even when the exposure increases.

After the above process is repeated a number of times corresponding to the number of exposures to be combined (three times in this embodiment), the output section 426 outputs the image in which the information of the exposures are combined, to the outside of the image sensor 404.

The image processing which the image processor 409 in the server 406 performs for the image signal is similar to that described in the first embodiment with reference to FIG. 1.

This embodiment can also realize an image capturing apparatus that can generate a plurality of (two or more) estimated images corresponding to a plurality of exposures while preventing a data amount from increasing and a resolution from lowering.

Example 4

A description will be given of an image capturing apparatus according to a fourth embodiment of the present invention. The image capturing apparatus of this embodiment provides mutually different transmittance distributions to a plurality of exposures using a parallax division.

Figure 14:
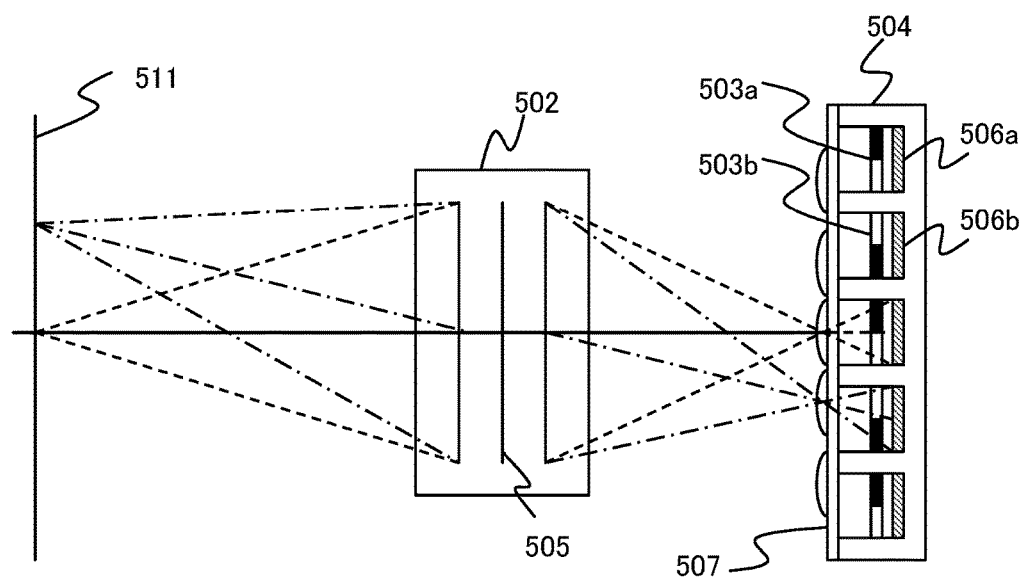
FIG. 14 is a sectional view of a configuration of an image capturer in an image capturing apparatus according to a fourth embodiment.

The configuration and overview of the image capturing apparatus according to this embodiment are similar to those illustrated in FIGS. 2A and 2B, although the image capturer 101 illustrated in FIG. 2A is replaced with a configuration illustrated in FIG. 14.

Figure 15:
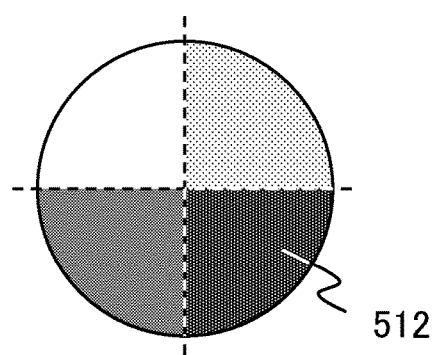
FIG. 15 is a view for explaining a light attenuation filter according to the fourth embodiment.

An image sensor 504 includes a plurality of pixels, and a micro lens array 507 that includes one small lens for each pixel. Photoelectric converters 506a, 506b, 506c, ..., (collectively referred to as "506" hereinafter), such as photodiodes, are provided to the plurality of pixels one by one. The micro lens array 507 and an object plane 511 have a conjugate relationship via an imaging optical system 502. A pupil of the imaging optical system 502 and the photoelectric converter 506 have a conjugate relationship via the micro lens array 507. The conjugate relationship, as used herein, covers a relationship that slightly shifts from a perfectly conjugate relationship between the pupil of the imaging optical system 502 and the photoelectric converter 506 because a distance between the pupil in the imaging optical system 502 and the micro lens array 507 is much larger than a focal length of the micro lens array 507. A light attenuation filter 505 illustrated in FIG. 15 is disposed at an aperture stop position in the imaging optical system 502. Therefore, a transmittance distribution corresponding to a transmittance distribution of the light attenuation filter 505 (although the illustrated concentration represents a magnitude of the transmittance) is provided to the pupil in the imaging optical system 502. It is thereby understood that an image with a different exposure (light intensity distribution) is formed according to a pupil position (viewpoint).

Each pixel in the image sensor 504 is provided with the above photoelectric converter 506 and the transmittance distribution provider 503 (503a, 503b, 503c, ...). In the following description, 503a etc. represents a transmittance distribution provider provided to one pixel, and 503 collectively represents all transmission distribution providers.

Figure 16:
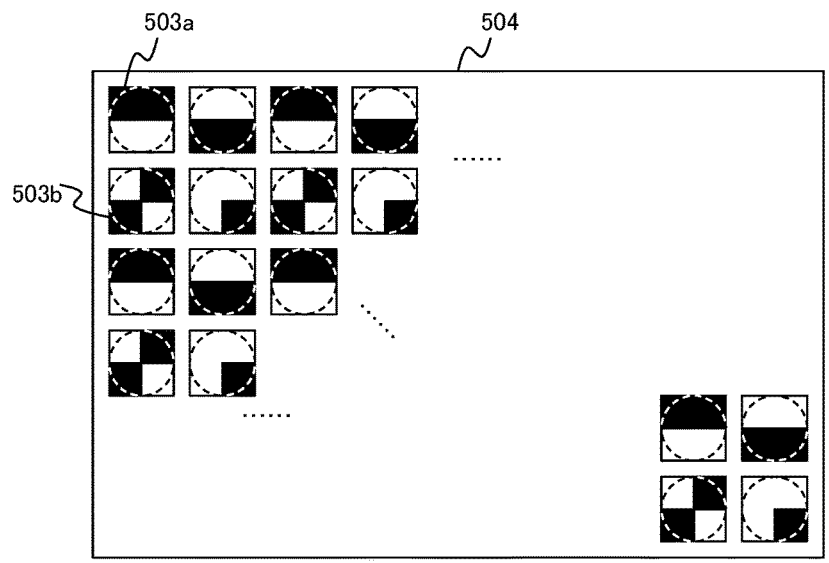
FIG. 16 is a view for explaining a transmittance distribution provider according to the fourth embodiment.

FIG. 16 illustrates a configuration of the transmittance distribution provider 503. The transmittance distribution provider 503 includes a transparent part that is drawn in white and a light shield that is drawn in black in FIG. 16. The transmittance distribution provider 503 shields light from a different region for each pixel in the image sensor 504. A broken-line circle in FIG. 16 represents an image of the pupil in the imaging optical system 502 to be imaged on each photoelectric converter 506. It is understood from FIG. 16 that each pixel is provided with a different transmittance according to a pupil position.

Next follows a description of a captured image (input image) obtained by the image sensor 504. A description will be given of a case where an object space is observed (or the image sensor is exposed) through a partial region in a pupil (referred to as a "partial pupil region" hereinafter). Herein, the object space is observed through the lower right partial pupil 512 in FIG. 15, but the following description is similarly applicable to an observation through another partial pupil.

The object space image observed through the partial pupil 512 can be reproduced by condensing only light that passes the partial pupil 512 (which becomes light that enters the upper left region in each pixel in FIG. 15 because the pupil forms an inverted image on the photoelectric converter). Assume that the object space image is equivalent to a light intensity distribution $I_1(x, y)$ illustrated in the top stage (k=1) in FIG. 17. The transmittance distribution $t_1(x, y)$ provided by the transmittance distribution provider 503 to the light intensity distribution is obtained by arranging the transmittance component in the upper left region in each pixel in FIG. 16, and it is the transmittance distribution illustrated in the top stage in FIG. 17.

Figure 17:
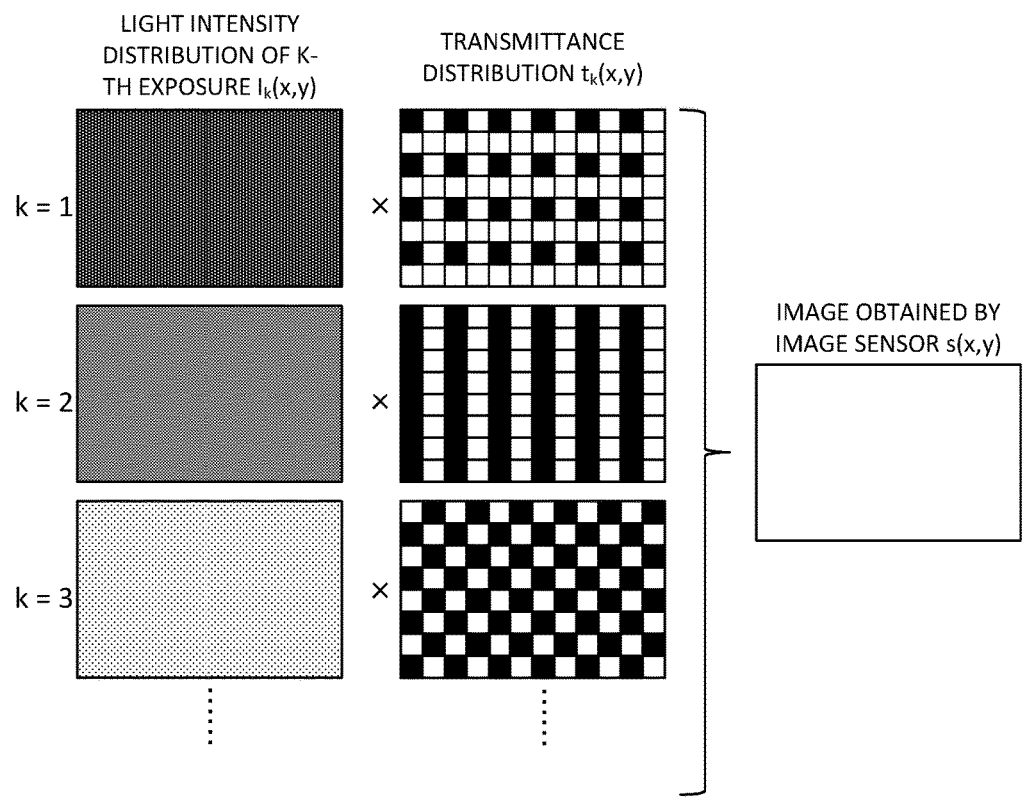
FIG. 17 is a view for explaining an input image (captured image) according to the fourth embodiment.

This is similarly applied to an observation through another partial pupil, and a middle stage k=2 in FIG. 17 illustrates a light intensity distribution when the object space is observed through the lower left partial pupil in FIG. 15 and the transmittance distribution provided to that light intensity distribution. A bottom stage k=3 in FIG. 17 illustrates a light intensity distribution when the object space is observed through the upper right partial pupil in FIG. 15 and the transmittance distribution provided to that light intensity distribution. As understood from FIG. 17, in the image sensor 504, a plurality of partial pupils correspond to a plurality of exposures, and the light intensity distributions in which different transmittance distributions are provided to the exposures are combined and acquired. When the light intensity distributions are combined, the captured image $s(x, y)$ illustrated in FIG. 17 is obtained. The light intensity distribution in the captured image $s(x, y)$ is omitted in FIG. 17.

While this embodiment disposes the light attenuation filter that has a plurality of regions with different transmittances, at an aperture stop position, and realizes a plurality of exposures that are different from one another, the transmittance distribution provider 503 may serve as a light attenuation filter. The transmittance distribution provider 503 can serve as the light attenuation filter and to provide the transmittance distribution by multiplying an inverted transmittance illustrated in FIG. 15 by each broken-line circle in FIG. 16.

The image processing for generating estimated images corresponding to different exposures is similar to that of the first embodiment, and a description thereof will be omitted.

This embodiment utilizes a parallax division, and thus can acquire a light intensity distribution at the same time for each exposure but mutually different parallaxes occur. When the configuration illustrated in FIG. 14 is adopted, there is no parallax at the in-focus position but a finite parallax occurs at a defocus position. Hence, there are position shifts in the light intensity distributions with a plurality of exposures according to an object distance. Accordingly, this embodiment is effective to a narrow object distance distribution in the object space, when the object distance distribution is compared with a depth of field of the imaging optical system 502. On the other hand, the configuration of the first embodiment is suitable for a wide object distance distribution.

Figure 18:
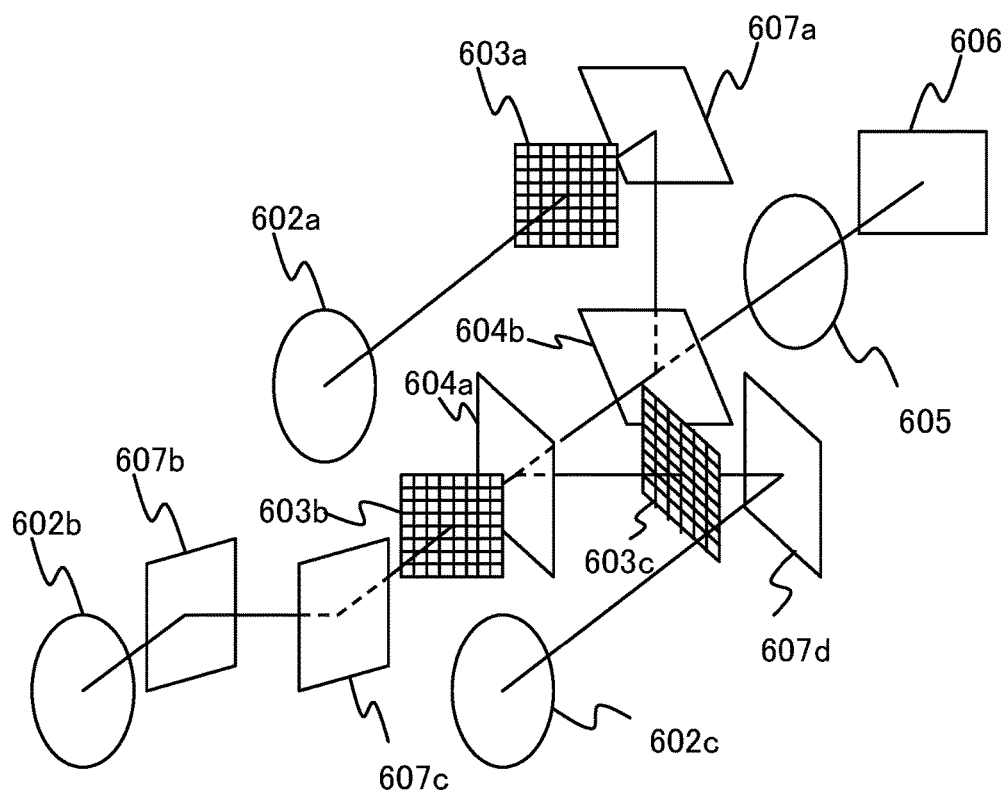
FIG. 18 is a view of another illustrative configuration of the image capturer according to the fourth embodiment.

A multi-view image capturer illustrated in FIG. 18 may be used as another image capturer that utilizes a parallax division. FIG. 18 arranges a plurality of imaging optical systems 602a to 602c having positive refractive powers. In this case, each pupil in the imaging optical systems 602a to 602c is a partial pupil, and a sum of the partial pupils corresponds to the pupil of the imaging optical system 502 illustrated in FIG. 14. Exposures through the imaging optical systems 602a to 602c are different from one another, and transmittance distribution providers 603a to 603c are arranged on image planes on the imaging optical systems 602a to 602c. This configuration forms an object space image provided with a different transmittance distribution for each exposure.

The imaging optical systems 602a to 602c have optical axes that shift from one another, but these optical axes can be accorded with one another with reflectors 607a to 607d and optical couplers 604a and 604b. The reflectors 607a to 607d may include a mirror, etc. and the optical axis couplers 604a and 604b may include a half-mirror, etc.

In FIG. 18, optical path lengths from the imaging optical systems 602a to 602c to the relay optical system 605 are configured equal to one another. The object space image formed by the imaging optical systems 602a to 602c are reimaged by the relay optical system 605, and received by the image sensor 606 having a plurality of pixels. Since the optical axes and optical path lengths are accorded with other among the imaging optical systems 602a to 602c which provide different exposures, the object space images provided with transmittance distributions that are different for each exposure are superimposed, captured, and obtained as a captured image in the image sensor 606. The image processing described in the first embodiment is performed for this captured image as an input image.

In the configuration illustrated in FIG. 18, the light that passes a half-mirror in the imaging optical system 602a a smaller number of times than the light that passes a half-mirror in each of the imaging optical systems 602b and 602c, and thus has a light amount larger than that of the light that has passed each of the imaging optical systems 602b and 602c. Based on this fact, the exposures of the imaging optical systems 602a to 602c may be set.

This embodiment can also realize an image capturing apparatus that can generate a plurality of (two or more) estimated images corresponding to a plurality of exposures while preventing a data amount from increasing and a resolution from lowering.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-155150, filed on Aug. 5, 2015, which is hereby incorporated by reference herein in its entirety.

REFERENCE SIGNS LIST 103, 303, 503 transmittance distribution provider
106 image processor
106a, 305a image acquirer
106b, 305b information acquirer
106d, 305d image estimator
305 image processing apparatus
403 signal selector

The invention claimed is:

1. An image processing apparatus comprising:
at least one processor connected to a memory, the at least one processor being configured to:
acquire a first image that is generated by image capturing and includes information of light intensity distributions obtained with a plurality of different exposures provided with transmittance distributions that are different from one another;

acquire information on the transmittance distributions; and separate image signals corresponding to two or more exposures among the plurality of exposures from the first image in the same pixel based on an estimation using the information on the transmittance distributions, and to generate two or more second images using the separated image signals.

2. The image processing apparatus according to claim 1, the at least one processor being configured to provide the estimation by including, in an evaluation value, a difference between the second images corresponding to a first exposure and a second exposure among the plurality of exposures.

3. The image processing apparatus according to claim 2, the at least one processor being configured to provide the estimation so as to reduce the difference between the second images corresponding to the first exposure and the second exposure in which luminances are accorded with each other.

4. The image processing apparatus according to claim 2, wherein the first exposure and the second exposure are exposures that have luminances closest to each other among the plurality of exposures.

5. The image processing apparatus according to claim 1, wherein a light intensity distribution corresponding to the brightest exposure among the plurality of exposures is obtained with a transmittance distribution having an average value smaller than that for a light intensity distribution corresponding to the darkest exposure among the plurality of exposures.

6. The image processing apparatus according to claim 5, wherein each average value of the transmittance distributions provided to the plurality of exposures monotonically decreases as the exposure increases.

7. The image processing apparatus according to claim 1, wherein a light intensity distribution corresponding to the brightest exposure among the plurality of exposures is obtained with a transmittance distribution that includes an area of a region having a transmittance of 0.1 or smaller, larger than that for a light intensity distribution corresponding to the darkest exposure among the plurality of exposures.

8. The image processing apparatus according to claim 1, wherein the following condition is satisfied:

$$0.5 \le \frac{t_{ave}(k_1)}{t_{ave}(k_2)} \le 2 \ (k_1, k_2 = 1, 2, \ , K)$$

where K is a total number of the plurality the exposures, and $t_{ave}(k)$ is an average value of a transmittance distribution provided to a k-th darker exposure among the plurality of exposures.

9. The image processing apparatus according to claim 1, the at least one processor being configured to generate, based on the two or more second images, a high dynamic range image having a dynamic range wider than that of each of the second images.

10. An image capturing apparatus comprising:
at least one processor connected to a memory, the at least one processor being configured to:
generate a captured image that includes information of light intensity distributions obtained with a plurality of different exposures provided with transmittance distributions that are different from one another
acquire a first image that is generated by image capturing and includes information of light intensity distributions obtained with a plurality of different exposures provided with transmittance distributions that are different from one another;
acquire information on the transmittance distributions;
separate image signals corresponding to two or more exposures among the plurality of exposures from the first image in the same pixel based on an estimation using the information on the transmittance distributions; generate two or more second images using the separated image signals; and acquire the captured image as the first image.

11. A non-transitory computer-readable storage medium which stores a program configured to enable a computer to execute image processing, the image processing comprising:
acquiring a first image that is generated by image capturing and includes information of light intensity distributions obtained with a plurality of different exposures provided with transmittance distributions that are different from one another;
acquiring information on the transmittance distributions; and
separating image signals corresponding to two or more exposures among the plurality of exposures from the first image in the same pixel based on an estimation using the information on the transmittance distributions, and generating two or more second images using the separated image signals.

* * * * *